(12) United States Patent
Barefoot

(10) Patent No.: US 9,322,449 B2
(45) Date of Patent: *Apr. 26, 2016

(54) VALVE FOR SHOCK ABSORBERS

(71) Applicant: Eko Sport, Inc., Grand Junction, CO (US)

(72) Inventor: Darek C. Barefoot, Grand Junction, CO (US)

(73) Assignee: Eko Sport, Inc., Grand Junction, CO (US)

( * ) Notice: Subject to any disclaimer, the term of this patent is extended or adjusted under 35 U.S.C. 154(b) by 395 days.

This patent is subject to a terminal disclaimer.

(21) Appl. No.: 13/774,086

(22) Filed: Feb. 22, 2013

(65) Prior Publication Data

US 2013/0161138 A1   Jun. 27, 2013

Related U.S. Application Data

(60) Continuation-in-part of application No. 13/345,197, filed on Jan. 6, 2012, now Pat. No. 8,727,080, which is a division of application No. 11/501,996, filed on Aug. 10, 2006, now Pat. No. 8,104,591.

(60) Provisional application No. 60/707,385, filed on Aug. 11, 2005.

(51) Int. Cl.
*F16F 9/34* (2006.01)
*F16F 9/516* (2006.01)
*F16F 9/46* (2006.01)

(52) U.S. Cl.
CPC . *F16F 9/34* (2013.01); *F16F 9/461* (2013.01); *F16F 9/516* (2013.01); *F16F 2222/06* (2013.01)

(58) Field of Classification Search
CPC ..... F16F 9/5126; F16F 2222/06; F16F 15/03; F16F 9/18; F16F 9/464
USPC .......... 188/267.2, 282, 7, 322, 13, 15, 299, 1, 188/319; 280/276
See application file for complete search history.

(56) References Cited

U.S. PATENT DOCUMENTS

| | | | |
|---|---|---|---|
| 3,026,903 A | | 3/1962 | Roach |
| 3,414,092 A | * | 12/1968 | Speckhart ............ 188/275 |
| 3,495,620 A | | 2/1970 | Raimondi et al. |
| 4,597,411 A | * | 7/1986 | Lizell ............ 137/493.8 |
| 4,690,371 A | | 9/1987 | Bosley et al. |
| 4,874,012 A | * | 10/1989 | Velie ............ 137/557 |
| 4,946,009 A | | 8/1990 | Knutson |
| 4,971,344 A | * | 11/1990 | Turner ............ 280/276 |

(Continued)

*Primary Examiner* — Robert A Siconolfi
*Assistant Examiner* — Mahbubur Rashid
(74) *Attorney, Agent, or Firm* — Jason H. Foster; Kremblas & Foster

(57) ABSTRACT

A shock absorber having a valve controlling the flow rate of fluid between a compression chamber and a rebound chamber in a housing and separated by a piston. The valve has an orifice component and a blocker component, one of which has a permanent magnet, and the other of which has a magnetically permeable material. Upon the application of sufficient fluid pressure, the blocker component is forced away from the orifice component, despite the magnetic bias that tends to attract the two structures. Because the magnetic force decreases as the two components are spaced farther apart, the shock absorber has excellent performance characteristics. Alternatively, a mechanical spring urges the blocker closed, and magnetic attraction between the blocker and a spaced opener mitigates the increased force of the compressed spring tending to close the valve.

27 Claims, 22 Drawing Sheets

(56) References Cited

U.S. PATENT DOCUMENTS

| | | |
|---|---|---|
| 4,973,854 A | 11/1990 | Hummel |
| 5,025,899 A | 6/1991 | Lizell |
| 5,244,063 A | 9/1993 | Laurien et al. |
| 5,277,283 A * | 1/1994 | Yamaoka et al. .......... 188/282.2 |
| 5,320,136 A | 6/1994 | Morris et al. |
| 5,386,893 A * | 2/1995 | Feigel ........................ 188/266.5 |
| 5,542,509 A | 8/1996 | Bell |
| 5,598,903 A * | 2/1997 | Richardson ................... 188/275 |
| 6,105,987 A | 8/2000 | Turner |
| 6,131,709 A | 10/2000 | Jolly et al. |
| 6,343,677 B2 | 2/2002 | Bell |
| 2004/0222056 A1 | 11/2004 | Fox |
| 2005/0104320 A1 | 5/2005 | Wesling |

* cited by examiner

VALVE FOR SHOCK ABSORBERS

CROSS-REFERENCES TO RELATED APPLICATIONS

This is a continuation-in-part of U.S. application Ser. No. 13/345,197, filed Jan. 6, 2012, which is a divisional application of U.S. application Ser. No. 11/501,996 filed Aug. 10, 2006, now U.S. Pat. No. 8,104,591, issued Jan. 31, 2012, which claimed the benefit of U.S. Provisional Application No. 60/707,385 filed Aug. 11, 2005. All these applications are incorporated herein by reference.

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

1. Field of the Invention

The invention relates generally to suspension components on vehicles, and more particularly to a shock absorber with a damper valve that incorporates magnetic bias to improve valve performance. Such a device may be referred to as a threshold valve.

2. Description of the Related Art

Conventional shock absorbers employ a piston in a cylinder containing a substantially incompressible fluid. Orifices in the piston and passages leading to a fluid reservoir regulate the flow of oil so as to damp the oscillation of a suspension spring. In more advanced designs, the orifices include sprung valves, which commonly take the form of holes covered by flexible shims made of elastically deformable material, such as spring steel. Valves of this design open progressively with greater force and can be used to damp low-speed compression and/or extension of shock absorbers while preventing pressure "spikes" and consequent harshness of ride when the suspension must compress deeply and quickly. They can also permit the shock to extend rapidly after deep compression while slowing it sufficiently near maximum extension to prevent harsh "topping out". Though superior to simple orifice dampers, dampers with flow-sensitive shims have limited potential for distinguishing between bumps and movements of the vehicle chassis.

In recent years some shock absorbers have been equipped with damper valves that are electromechanically actuated and are controlled by an electronic feedback system, sometimes in combination with a compressor for selectively varying fluid pressure in the damper. The nature of a given suspension event in such an apparatus is determined by computational projection, and then adjustments to damping resistance are made according to programmed instructions.

An approach that is less complex than electronic control yet more sophisticated than traditional shimmed orifices employs valves that are biased toward the closed position by the pressure of a confined gas or a preloaded mechanical spring. These devices provide relatively stiff damping resistance up to a certain threshold of applied force. Once the threshold is reached and the valve begins to open, relatively little additional force is required to move the valve to its fully open position, since a gas spring or preloaded mechanical spring can be designed to offer resistance along a gently sloped plot of load vs. deflection. This kind of valve makes possible relatively heavy damping of forces that are gradually applied to the suspension of a vehicle, such as rearward chassis movement during acceleration ("squat"), forward movement during braking ("dive"), and side-to-side tilt toward the outside of a curve ("roll") while providing somewhat lighter damping of rapid, forceful movements of the vehicle wheel as it encounters bumps and depressions in the road surface.

Yet another approach is to employ what is commonly known as an inertia valve in a compression and/or rebound circuit of the shock damper. This type of valve consists of a weighted element (or elements) supported by or suspended from a mechanical spring (or springs). The element covers an oil port, acting as a blocker, and is of such a weight relative to the spring constant of the supporting spring that the element is dislodged, and the port consequently opened, only by upward or downward acceleration of the vehicle wheel.

The variable damping response afforded by preloaded shock valves and inertia valves as described above is particularly desirable for off-road bicycle suspension systems. In order to climb hills, the bicycle rider typically must stand on the pedals and pull vigorously on the handlebars, causing the rider's body weight to shift side-to-side and fore-aft. Conventional suspension damping allows unwanted "bobbing" of the bicycle and loss of pedaling efficiency when the rider's weight shifts in this way. The off-road bicycle application therefore places a premium on dampers that offer increased resistance to rider-induced suspension movement while minimally compromising sensitivity to road-induced suspension movement, such as bumps.

Although a preloaded, sprung damper valve may open along a gently sloping load vs. deflection plot once its force threshold is reached, its sensitivity nevertheless is limited by the continued upward direction of the gradient. In the case of rapid compression, when a bump is encountered the initial vertical acceleration or "shock force" causes a sudden rise in pressure that begins to open the preloaded valve. But this acceleration, with its attendant peak pressure, fades long before the wheel finishes surmounting the bump, thereby allowing the valve to close prematurely under the countervailing force of the spring. With the valve closed, damping resistance increases and a substantial part of the bump force is transmitted to the vehicle chassis. As this transmission of bump force increases, the ride becomes harsher and the vehicle's traction over irregular surfaces becomes poorer.

Similarly, in the case of rapid extension of a shock in which the rebound damping circuit is governed by a preloaded, sprung valve, the spring that urges the valve to close may overcome the force exerted by oil flow through the rebound circuit before the shock absorber fully extends, thereby reducing the available stroke of the suspension and adversely affecting ride quality.

The rebound performance objective during extension is rapid recovery from deep compression followed by smooth deceleration as extension is reached. Valves biased toward the closed position by mechanical springs necessarily limit the extent to which dampers can achieve this objective, because the spring force applied increases as the valve is opened further, thereby requiring an increasing force to maintain the valve in an open position at a time when the valve-opening force inherently decreases.

Inertia valves are subject to an analogous problem due to the progressively increasing resistance of a coil or leaf spring as it deflects. The sprung element that acts as a valve blocker, after having been dislodged by acceleration of the vehicle wheel as it moves over a bump, tends to return to the closed position before the bump has been fully negotiated. The result, again, is transmission of bump force to the chassis. Even in designs where the movement of the sprung blocker element is itself hydraulically damped, the spring return force is sufficient to impart inertia to the element. The inertia imparted by the spring to the blocker element may vary undesirably the response of the valve to accelerations of the vehicle wheel as it traverses bumps of different sizes at different frequencies.

In view of the above, the need exists for a damper valve that is biased toward the closed position at least partly by a force that does not increase as the valve opens.

BRIEF SUMMARY OF THE INVENTION

The ability of a suspension damper to control unwanted chassis movements and yet compliantly absorb bumps is enhanced by the present invention insofar as damper valve closure in the invention is maintained by a force that moderates as the valve opens. The higher the force holding the valve in the closed position, the less unwanted chassis movement will occur. However, the lower the force urging closure of the valve once the valve opens, the longer the period of hydraulic fluid flow during the traversal of a bump and the less jounce will be transmitted to the vehicle (i.e., the better the vehicle will absorb the shock). A retrogressive component of biasing force on the valve also enhances suspension performance during rebound. Valves requiring a lower force to remain in the open position relative to the biasing force acting upon them in the closed position approach the performance ideal of rapid recovery from deep compression followed by smooth deceleration as extension is reached.

A preferred embodiment of the present invention is a damper with a compression and/or rebound valve biased toward the closed position either partly or entirely by continuous magnetic force. The magnetically sprung valve may be combined with an external mechanical adjustment means. The adjustment means permits the magnetic force to be varied, or permits a non-magnetic biasing force acting in combination with magnetism to be altered so as to change the relative amount of overall valve closing force due to magnetism. Since the maximum rate of fluid flow through the compression or rebound circuit of the damper determines the peak pressure that can be exerted on the magnetically sprung valve, auxiliary valves that vary maximum rate of flow can also dynamically interact with the magnetically sprung valve to give the damper its performance features.

The elements of the valve are arranged such that the slope of the load/deflection gradient governing the action of the valve is reduced by the magnetic component of force acting on the valve. Thus, an externally adjustable force threshold is created above which the valve opens to a greater degree than it would were closure maintained exclusively by mechanical spring pressure. Valves having this characteristic are useful in the design of shock absorbers that feature a different damping rate for low-speed suspension events (i.e., inertial movement of sprung vehicle mass) as opposed to the rapid compression and extension that occurs when the vehicle wheel encounters bumps (movement of unsprung mass).

In an alternative embodiment of the invention, a mechanical spring can be used to close the valve with a magnetic spring that urges the valve to the open position once pressure due to compression has opened the valve. A coil spring biases the valve closed, and is combined with a structure in which magnetic attraction tends to keep the valve open once the valve has opened by overcoming the coil spring bias. The attraction between a valve component and an opener becomes substantial once the valve opens, and as the valve component moves farther from the closed position, the magnetic attraction increases. This thereby counteracts the increase in force tending to close the opened valve by increasing the magnetic attraction that tends to open the valve as the compression of the coil spring increases.

In an alternative embodiment, a shock absorber may have a housing with a cylindrical sidewall. The shock absorber may include a valve in a fluid communication path between a first chamber containing fluid and a second chamber containing fluid. The valve may have an orifice component and a moveable orifice blocker component. The blocker may have at least an open position, in which fluid can flow through the orifice, and a closed position, in which the blocker substantially obstructs fluid from flowing through the orifice. At least one biasing element may be disposed in the valve. The at least one biasing element may exert a biasing force urging the blocker toward the closed position. The at least one biasing element may contribute to a total biasing force that urges the blocker in the closed position to remain in the closed position. At least one of the blocker and the biasing element may be configured to move at least partially through an inertial effect of forces. Every component of the total biasing force may be applied to the blocker by structures contained entirely within the shock absorber. Every component of the total biasing force that is controlled so as to vary said total biasing force, may be controlled only by at least one non-electromagnetic device selected from the group of pneumatic, hydraulic and mechanical devices. When the blocker is in the open position, the biasing force urging the blocker back to the closed position may be no greater for any particular piston stroke position than said corresponding total biasing force at said particular piston stroke position.

A third chamber may be in fluid communication with the at least one of the other two chambers. The first chamber may be a compression chamber. The second chamber may be a rebound chamber. The third chamber may be a reservoir chamber. A secondary valve may be disposed between the third chamber and at least one of the other two chambers.

In another embodiment, a shock absorber may have a housing having a cylindrical sidewall. A piston may slidably mounted in and may sealingly engage the sidewall. A first chamber may be formed on one side of the piston within the housing and may contain fluid and a second chamber in the housing may contain fluid. A valve may be in a fluid communication path between the first and second chambers. The valve may have an orifice component and an orifice blocker component. The blocker may have at least an open position in which fluid can flow through the orifice and a closed position in which the blocker substantially obstructs fluid from flowing through the orifice. A permanent magnet may be in at least one of said valve components. A magnetically permeable body may in the other of said valve components, whereby the blocker is urged toward one of the blocker positions by a magnetic bias formed by the permanent magnet and the magnetically permeable body. The valve may be configured such that upon sufficient inertial force upon at least one valve component the magnetic bias is exceeded, thereby moving the blocker from the one of the blocker positions to the other of the blocker positions.

The first chamber may be a compression chamber and the second chamber may be a rebound chamber. The magnetic bias may tend to bias the blocker toward the closed position. A third chamber may be intermediate the first chamber and the second chamber. A second orifice may allowing fluid passage through the piston.

In another embodiment, a shock absorber may have a housing having a cylindrical sidewall. A piston may be slidably mounted in and sealingly engage the sidewall. A first chamber may be formed on one side of the piston within the housing and contain fluid. A second chamber may be in the housing and contain fluid. A third chamber may be in fluid communication with the first chamber. An inertial valve may be in a fluid communication path between the first chamber and a selected one of the other chambers. The valve may have an orifice component and an orifice blocker component. At least one of said valve components may be moveable relative to another of said valve components between at least an open valve position in which fluid can flow through the orifice between the first chamber and the selected chamber and a closed valve position in which the blocker substantially obstructs fluid from flowing through the orifice. A permanent magnet may be in at least one of said valve components. A magnetically permeable body may be in the other of said valve components, whereby the valve components are urged toward one of the valve positions by a magnetic bias formed by the permanent magnet and the magnetically permeable body. The magnetic bias may be exceeded, at least in part, by inertial force.

The first chamber may be a compression chamber. The second chamber may be a rebound chamber. The third chamber may be a reservoir chamber. The magnetic bias may tend to bias the blocker toward the closed position. A fourth chamber may be intermediate the first chamber and the second chamber. At least a second orifice may allow fluid passage through the piston.

In another embodiment, a shock absorber may have a housing with a cylindrical sidewall. A piston may be slidably mounted for reciprocating through a piston stroke in and may sealingly engage the sidewall. A first chamber may be formed on one side of the piston within the housing and contain fluid. A second chamber may be in the housing and contain fluid. A third chamber may accommodate a variable volume of fluid. The third chamber may be in fluid communication with the first chamber. A valve may be in a fluid communication path between the first chamber and a selected one of the other chambers. The valve may have an orifice component, an opener component spaced from the orifice and an orifice blocker component. The blocker may have at least an open position in which fluid can flow through the orifice and a closed position in which the blocker substantially obstructs fluid from flowing through the orifice. A non-electromagnetic permanent magnet may be in one of the blocker and the opener. A magnetically permeable body may be in the other of the blocker and the opener for urging the blocker toward one of the open position or the closed position. The blocker may be configured to move from one of the blocker positions to the other of the blocker positions upon the application of sufficient inertial force in operable position.

The first chamber may be a compression chamber. The second chamber may be a rebound chamber. The third chamber may be a reservoir chamber. Magnetic bias may tend to bias the blocker towards the closed position. A fourth chamber may be intermediate the first chamber and the second chamber. At least a second orifice may allow fluid passage through the piston. A mechanical spring may be seated against the blocker and may urge the blocker toward the closed position.

In another embodiment, a shock absorber may include a housing having a cylindrical sidewall, a first chamber containing fluid, and a second chamber containing fluid. A valve may be in a fluid communication path between the first chamber and the second chamber. The valve may have an orifice component and an orifice blocker component. The orifice component and the orifice blocker component may be configured to move relative to one another between at least an open valve position in which the orifice blocker component is spaced from the orifice component and a closed valve position in which the orifice blocker component is adjacent, and substantially obstructs fluid from flowing through, the orifice. A magnetically attractive element may be positioned adjacent the orifice blocker component, whereby the orifice blocking component may be urged toward one of the valve positions by a magnetic bias formed by the magnetically attractive element and the orifice blocker component. Upon sufficient inertial effect of force upon at least one of the orifice blocking component and the magnetically attractive element, the magnetic bias between the magnetically attractive element and the orifice blocker component may be exceeded, thereby permitting the orifice blocker component to move from one of the valve positions to the other of the valve positions.

A biased secondary valve may be configured to open and close a second orifice. The first chamber may be a compression chamber and the second chamber may be a rebound chamber. A reservoir chamber may be in fluid communication with at least one of the first chamber and the second chamber. The valve may define a serpentine path for fluid to travel. The magnetically attractive element may be a permanent magnet. The orifice blocking component may be a permanent magnet.

In another embodiment, a shock absorber may have a first chamber containing fluid and a second chamber containing fluid, and a valve therebetween. The valve may include a substantially annular tube, which may include at least one orifice allowing fluid flow at least indirectly between the first chamber and the second chamber. The valve may further include an orifice blocker which may be configured to reciprocate between a first position wherein the orifice blocker portion substantially prevents fluid from flowing through the at least one orifice in the substantially annular tube and a second position wherein fluid is permitted to flow through the at least one orifice in the substantially annular tube. The valve may further include a lock capable of holding the orifice blocker in the first position. At least one of the orifice blocker and the lock may be configured to move relative to the other of the orifice blocker and the lock after being acted on by inertial forces when in operable position.

The first chamber may be a compression chamber. The second chamber may be a rebound chamber. The second chamber may be a reservoir chamber. The tube may have a free end capable of permitting fluid to flow between the first chamber and the second chamber. The lock may be configured to be capable of moving when acted on by inertial forces. The lock may be an o-ring within an inertial mass. The orifice blocker may be a lip capable of interlocking with the o-ring. Magnetic bias may hold the orifice blocker in the first position. The orifice blocker may be configured to be capable of moving when acted on by inertial forces.

In another embodiment, a shock absorber may include a first substantially annular portion, a second substantially annular portion, and a third substantially annular portion. The first substantially annular portion may be positioned between a first chamber and a second chamber and may be configured to allow fluid to flow between the first chamber and the second chamber. The second substantially annular portion may be positioned adjacent the first substantially annular portion. The second substantially annular portion may be configured to move between a first position, where, in operative position, fluid is permitted to flow from the first chamber to the second chamber and a second position where, in operative position, fluid is permitted to flow from the second chamber to the first chamber. The third substantially annular portion may be capable of reciprocating between a first position where the third annular portion interlocks with the second annular portion and a second position remote from the second annular portion. The third annular portion may be configured to move from the first position to the second position through inertial forces acting on the third substantially annular portion.

Each of the second substantially annular portion and the third substantially annular portion may be substantially concentric with the first substantially annular portion. The second substantially annular portion may further include an outward facing lip and the third substantially annular portion may further include an inward facing lip. The third substantially annular portion may define a substantially annular recess adjacent the inward facing lip. A resilient o-ring may be positioned within the substantially annular recess. The lips may be positioned on opposite sides of the o-ring when the second substantially annular portion and the third substantially annular portion are interlocked. A spring may be capable of moving the third annular portion toward a position where the third annular portion and the second annular portion are interlocked with one another.

Figure 1:
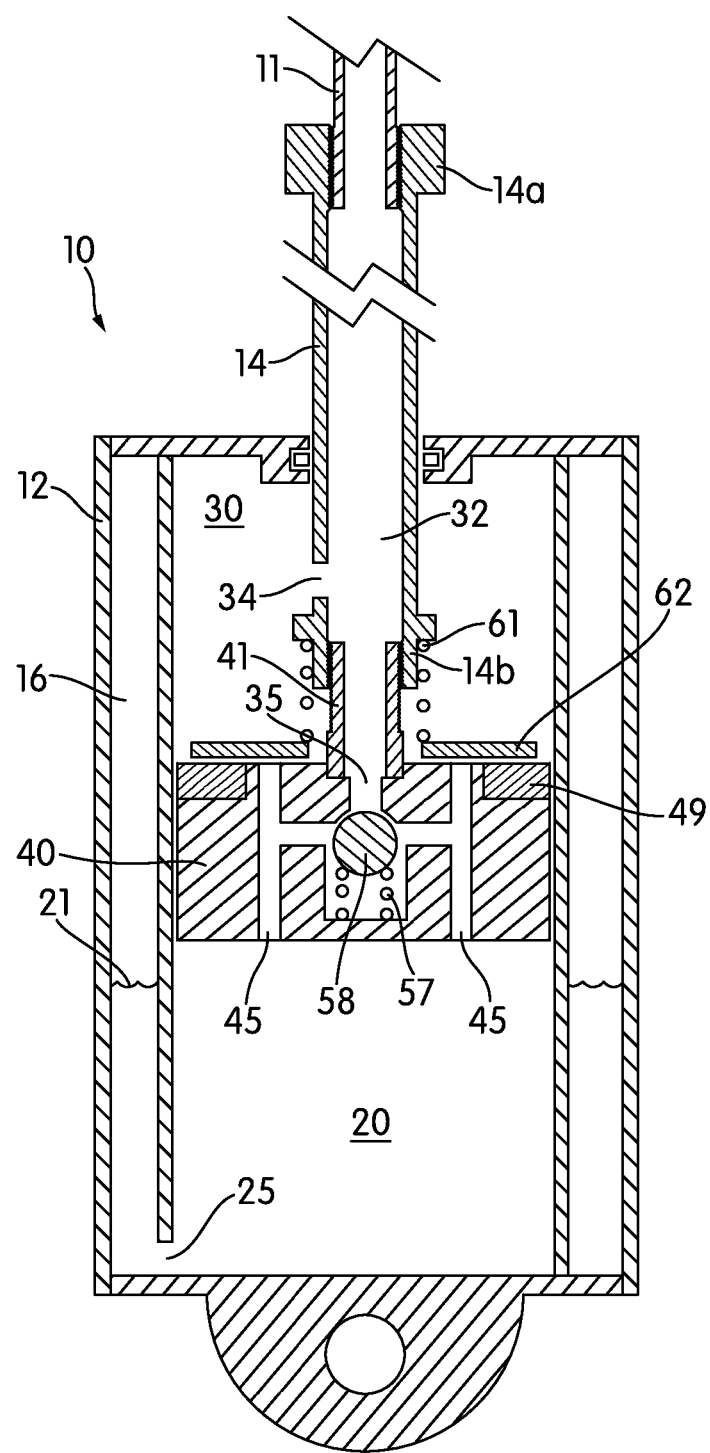
FIG. 1 is a section view illustrating an embodiment of the present invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

In the present disclosure, a plurality of valves are disclosed and described as being used in connection with one or more shock absorbers. Each of these valves is shown as being positioned between two fluid-filled chambers and functions generally to control the flow of fluid between the two chambers. In many embodiments, the disclosed valves control the flow from a first one of the chambers to a second one of the chambers in one manner and control the flow from the second one of the chambers back to the first one of the chambers in a different manner. The flow of fluid from the first to the second chamber may accompany a compression stroke of the shock absorber. The flow of fluid from the second to the first chamber may accompany a rebound stroke of the shock absorber. The combination of the compression stroke and the rebound stroke of the shock absorber may be considered a stroke of the shock absorber.

Although each valve is shown as being positioned directly between two particular fluid-filled chambers, each valve may be positioned instead between two different fluid-filled chambers. For example, a valve shown as being positioned between a compression chamber and a rebound chamber to control flow therebetween could alternatively be positioned between a compression chamber and a reservoir chamber. In addition, a shock absorber may be designed to incorporate a fluid-filled chamber intermediate, for example, a compression chamber and a rebound chamber. The disclosed valves may be positioned between the intermediate chamber and the compression chamber or between the intermediate chamber and the rebound chamber. A person having ordinary skill in the art can make any small changes necessary to accommodate the fluid flow between the precise chambers desired without undue experimentation. When a valve is described as being between two specific chambers, it will be understood that such a disclosure also includes positioning between any two chambers desired by the designer.

It is noted also that in any hydraulic shock absorber, such as those described herein, the hydraulic fluid may be designed to flow between a variety of chambers. A valve positioned between two specific chambers to control flow between those two chambers may also have the effect of controlling flow between others of the chambers, as will be understood by a person having ordinary skill in the art. For example, a valve described and shown as being positioned between a compression chamber and a rebound chamber may also affect fluid flow between that compression chamber and a reservoir chamber. In addition, because the fluid flow paths in the shock absorbers are substantially continuous, the precise position of the valve within the shock absorber is not critical to determining which chambers the valve is positioned between. For example, if a compression chamber is positioned between the reservoir chamber and a rebound chamber and fluid is permitted to flow from the reservoir chamber to the compression chamber and then to the rebound chamber, the positioning of the valve directly between the compression chamber and the rebound chamber is also the positioning of the valve between the reservoir chamber and the rebound chamber. Further, the insertion of an intermediate chamber does not affect the positioning of the valve as being between two chambers. For example, if an intermediate chamber is inserted between a compression chamber and the rebound chamber, then the positioning of the valve between the compression chamber and the intermediate chamber is also the positioning of the valve between the compression chamber and the rebound chamber and between the reservoir chamber and the rebound chamber, in addition to being between the compression chamber and the intermediate chamber. Accordingly, a broad interpretation of the valve position may be understood by a person having ordinary skill in the art.

FIG. 1 shows the basic components of the shock absorber damper 10 including the cylindrical housing 12, the piston rod 11 and piston 40. The double wall of the housing forms the compartment 16 that contains a gas or other compressible medium that permits the level of fluid in the reservoir 21 to vary with displacement of fluid from the chamber 20 through the port 25 as the piston rod enters the housing. This is described more fully below.

The velocity at which the piston 40 can move further into the housing under a given load is partly governed by the rate at which oil or other hydraulic fluid can flow from the compression chamber 20 through the port 45 in the piston 40, thence past the compression shim 62 and into the rebound chamber 30. It will become apparent that the compression shim 62 serves as part of a valve that is biased into the closed position by magnetic attraction between the shim 62 and the ring 49 embedded in the piston. These cooperating components tend to force the shim 62 in sealing contact with the piston 40, thereby blocking or severely restricting oil flow below a threshold of hydraulic pressure.

Either the shim 62 component of the valve is a magnet, preferably a permanent magnet, or the ring 49 component of the valve is a magnet. The other of the components is a magnetically permeable material. The term "magnetically permeable" is defined herein to mean any material that is magnetically attracted to a magnet, including but not limited to a magnet, iron or an iron alloy. The magnets described herein can consist of discrete segments of the components in which they are shown in the illustrations, or the entire structure in which the components are shown mounted. For example, where the ring 49 is shown mounted in the piston 40 in FIG. 1, the entire piston can, in an equivalent structure, be made of a magnetic material. Likewise, the entire shim 62 is shown as a magnet, but it is possible to make only a portion of the shim a magnet. In one contemplated embodiment the ring 49 is a magnet and the shim 62 is a steel washer. Whether the shim, or the ring, or both are magnetized can affect the level of force desired, which will be determined based upon other practical considerations.

The ports 45 are formed in the piston 40 to form orifice components of the valve. The orifice components are the openings in a structure through which fluid can flow and the immediately surrounding structure in which a magnetically permeable structure can be mounted. Thus, the orifice components of FIG. 1 include at least parts of the piston 40 and the ring 49. Furthermore, the shim 62 is a moveable orifice blocker component of the valve, which prevents or reduces fluid flow through the orifice when the blocker is in its closed position in the orifice or against the surrounding structure. The orifice blocker is urged toward a closed position (in a direction opposite the direction of fluid flowing through the orifice) by a magnetic bias formed by the permanent magnet and the magnetically permeable body. Upon the application of sufficient force by fluid in one chamber, the magnetic bias will be exceeded, thereby forcing the blocker from the closed position to the open position. Thus, the valve components include the orifice components and blocker components.

The sealing action of the shim 62 is further maintained in the preferred embodiment by the mechanical (coil) shim spring 61. It is contemplated that, in an alternative embodiment (not shown), there can be no mechanical spring 61. Instead, in this alternative, the magnetic spring can exert the entire valve-closing force. Other mechanical springs, including gas and elastomeric springs, can be substituted for the shim spring 61 in other alternatives, as will be apparent.

The velocity at which the piston rod 11 can re-extend after compression is governed by the rate at which oil can flow from the rebound chamber 30 into the hollow cavity 32 of the piston rod 11, through the orifice 35 of the piston 40, past the valve ball 58 (as the closing pressure of the valve spring 57 is overcome), and through the ports 45 into the compression chamber 20. As the piston 40 moves upward (in FIG. 1) during extension, previously displaced fluid in the reservoir 21 is drawn back into the compression chamber 20 through the port 25.

It will be appreciated that because closure of the compression circuit of the damper is affected at least partly by magnetic attraction between the valve components, the force required to hold the valve components in the open position will vary at least partly according to the principle of the diminution of magnetic force that occurs with increasing distance between magnetically attracted masses. This relationship embodied in the cooperating structures provides the advantage that the magnetic force tending to hold the damper valve closed is quite high when the valve is closed and decreases once the valve has been opened. Furthermore, the closing force of the magnetic attraction diminishes substantially as the shim 62 and ring 49 are spaced further apart. Of course, one need not have the magnetically attractive components in contact when the valve is closed. Thus, one may provide a structure in which magnetically attracted valve components never touch, but are configured to be close to one another when the valve is closed to have a similar effect (see FIG. 2 below and accompanying description).

In the configuration shown in FIG. 1, the force that urges the shim 62 toward the piston 40 is made up of a ratio of the magnetic attraction of the magnetically attracted components and the mechanical force of the spring 61. Thus, adjusting the preload on the spring 61 alters the damping characteristics of the device. An embodiment of a structure that adjusts the force tending to force the shim 62 against the piston 40 without affecting the proximity of the valve components will now be described. A linkage extends from the exterior of the shock absorber to the valve to adjust the bias tending to close the valve. In an exemplary linkage, a spring tension adjuster 14 is threadably engaged at its upper extremity 14a with the piston rod 11 and at its lower extremity 14b with the piston stud 41. Rotating the spring tension adjuster 14, preferably by a rotatable knob or other human hand-adjustable structure, relatively increases or decreases the preload (existing compression) of the coil shim spring 61 against the shim 62, thereby changing the ratio of the forces that urge the shim 62 toward the piston 40. Any suitable means by which the compression of the shim spring 61 is varied can be used to preload or unload the spring 61, as will be apparent to one of ordinary skill from the description herein.

Figure 2:
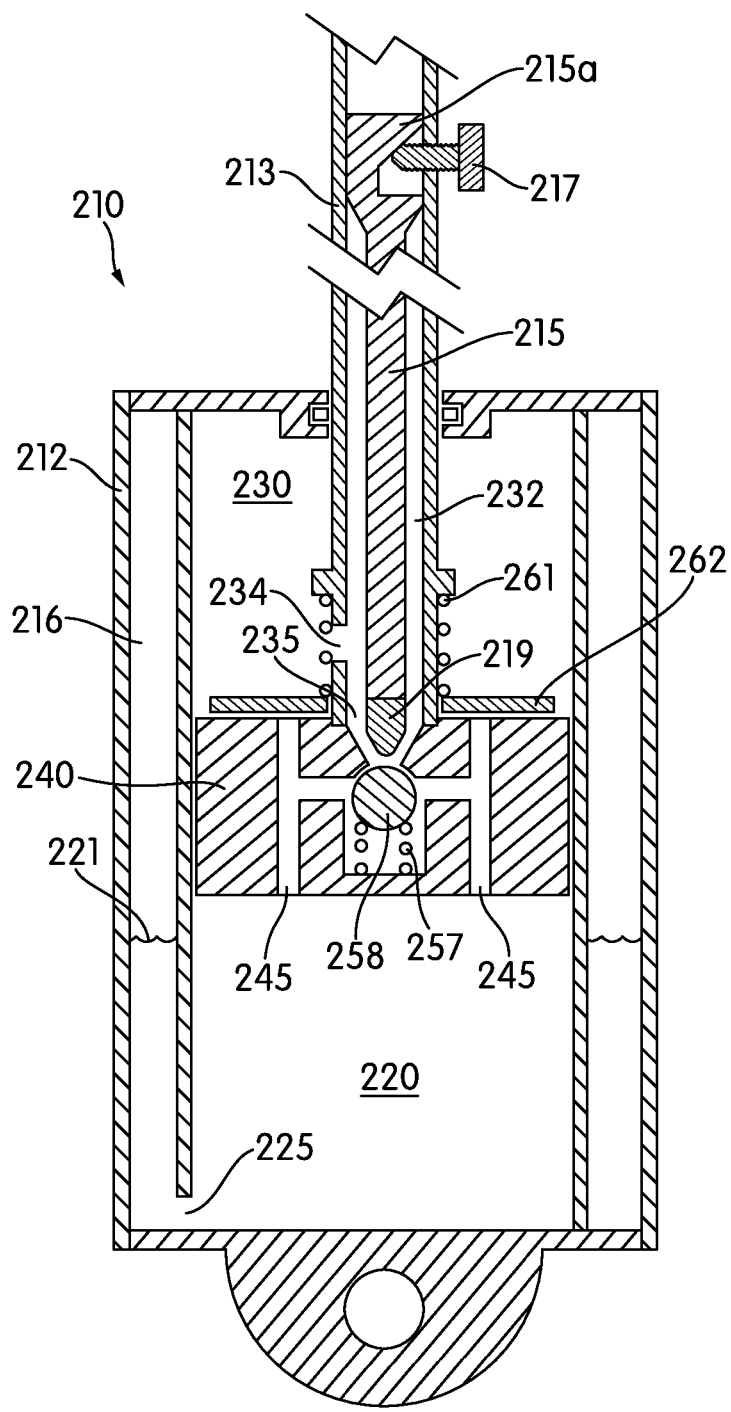
FIG. 2 is a section view illustrating an alternative embodiment of the present invention.

Referring to FIG. 2, many of the same basic structural elements are present as in the device of FIG. 1. Additionally, a device for adjusting the proximity of valve components is shown. Oil flows between chambers 220 and 230 through ports and orifices in the same directions as described in relation to FIG. 1. However, the flow of oil from the compression chamber 220 to the rebound chamber 230 is opposed solely by the pressure of the shim spring 261 against the shim 262. Furthermore, upon rebound the reverse flow from the rebound chamber through port 234 and orifice 235 is opposed not only by the force of the valve coil spring 257 against the valve ball 258 but by a magnetic attraction between the valve ball and the end piece 219 of the adjuster needle 215. One of the valve ball 258 or end piece 219 is a permanent magnet, while the other is a magnetically permeable material. Of course, both may be permanent magnets oriented attractively with respect to each other.

The adjuster needle 215 is contained within the hollow piston rod 213. The upper extremity of the needle forms the cam 215a abutted angularly against the shaft of the threaded adjustment knob 217. When the knob 217 is tightened, the needle 215 is forced axially upwardly within the piston rod 213. When the knob 217 is loosened, hydraulic suction during rebound in combination with the magnetic attraction between the end piece 219 and valve ball 258 moves the needle 215 axially downwardly to the extent permitted by the abutment of the cam against the shaft of the knob. The axial displacement of the needle 215 in turn varies the gap between the end piece 219 and the valve ball 258 and thereby varies the strength of the magnetic component of force acting to maintain closure of the valve. When the valve components are closer, the strength increases. Rapid rebound of the damper occurs when the adjustable force threshold created by the magnetic attraction between the end piece 219 and valve ball 258 is overcome. Any suitable means by which the relative positions of the valve ball 258 and the end piece 219 are varied can be used to vary the amount of magnetic attraction between the valve components, as will be apparent to one of ordinary skill from the description herein.

Because the magnetic component of force diminishes as the valve opens and the valve components are thereby spaced further apart, during rebound oil will continue flowing relatively longer than it would were closure maintained by a comparable level of force generated solely by preload on the coil valve spring 257. The damper thus can be adjusted, using the adjustment means described herein, to rebound slowly during recovery from suspension events of low amplitude but rebound rapidly following deep compression. The rapid rebound allows for rapid recovery of the suspension, yet the closure of the valve and re-establishment of the activation threshold near the end of the rebound stroke prevents reactive jounce and harsh "topping out".

The ports 235 are formed in the piston 240 to form an orifice component of the valve. The orifice component is in a structure through which fluid can flow and the immediately surrounding structure in which a magnetically attractive structure (end piece 219) is mounted. The valve ball 258 is a moveable orifice blocker component of the valve, which prevents or reduces fluid flow through the orifice when the blocker is in its closed position. The orifice blocker is thus urged toward a closed position (in a direction opposite the direction of fluid flowing through the orifice) by a magnetic bias formed by the permanent magnet and the magnetically permeable body. Upon the application of sufficient force by fluid in one chamber, the magnetic bias will be exceeded, thereby forcing the blocker from the closed position to the open position.

Figure 8:
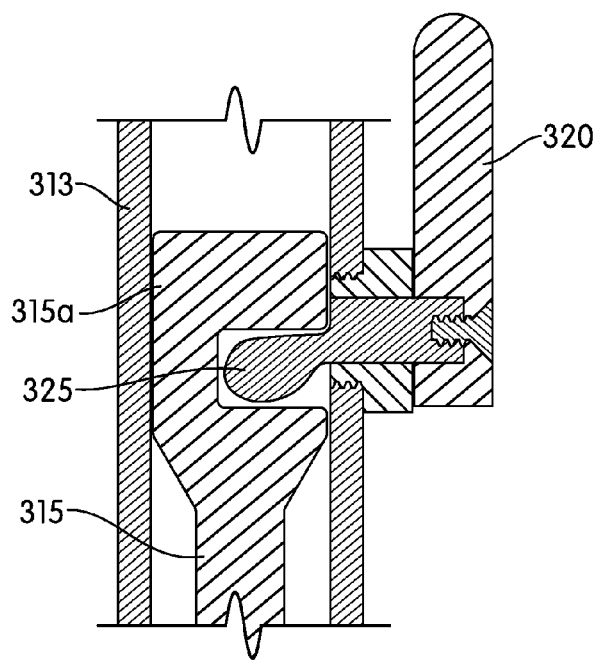
FIG. 8 is a side view in section illustrating an alternative means for adjusting the magnetic and/or mechanical spring bias.

FIG. 8 shows an alternative method of adjusting the distance between magnetic valve elements in a device like that shown in FIG. 2, or the pre-loaded compression on the mechanical spring shown in FIG. 1. The adjuster needle 315 is within the shock absorber shaft 313, and the top segment 315a is formed to accept the lobe 325 of a cam lever 320. The cam lever 320 is rotatably mounted in the shaft 313. When the cam lever 320 is rotated, the offset tip thereof displaces the adjuster needle 315 axially up or down (in the orientation illustrated in FIG. 8) within the shaft 313, causing the magnetic tip of the needle (not shown but similar to that in FIG. 2) to be brought closer to or farther from the other magnetic elements of the valve. Thus, the degree of magnetic bias acting on the valve is altered. Of course, the same mechanism can be used to adjust the amount of pre-load compression on the spring 61.

Figure 9:
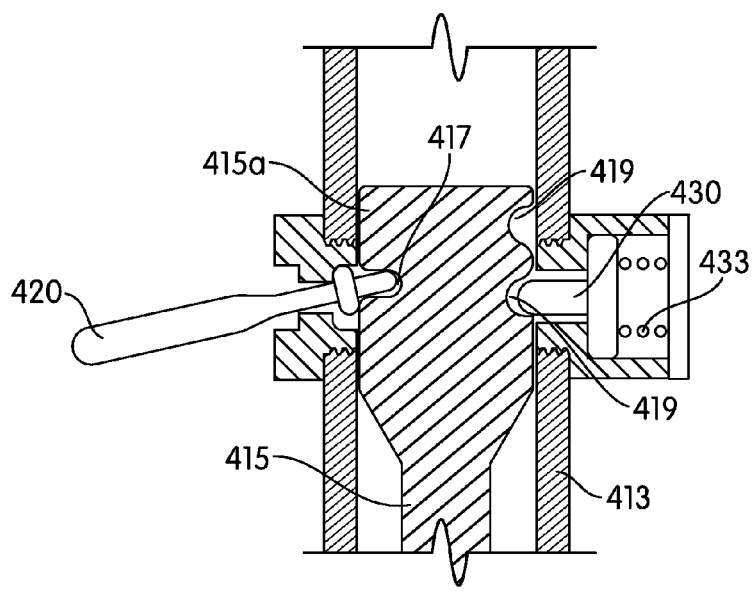
FIG. 9 is a side view in section illustrating an alternative means for adjusting the magnetic and/or mechanical spring bias.

FIG. 9 shows still another means of adjusting the springs that is similar in function to that of FIGS. 2 and 8. The adjuster needle 415 is within the shaft 413, and the top segment 415a is formed with the cavity 417 on one side. The end of the lever switch 420 is engaged with the cavity 417, and pivoting movement of the lever switch 420 up or down (in the orientation illustrated in FIG. 9) displaces the adjuster needle 415 axially within the shaft. The position of the adjuster needle 415 is maintained by a series of cavities 419 opposite the cavity 417. The plunger 430, under the action of the spring 433, remains engaged with a particular one of the cavities 419 and thereby maintains the axial position of the adjuster needle until a force is exerted on the lever switch 420 that causes the adjuster needle 415 to move, thereby dislodging the plunger 430 from one cavity and allowing it to engage another.

By these means the distance, and therefore the attractive force, between the magnetic valve components on the lower end (not shown—similar to that shown in FIG. 2) of the adjuster needle 415 and other magnetic valve components is altered. Of course, the structure of FIG. 9 could also be used to vary the pre-load compression on the mechanical spring 61 shown in FIG. 1.

Figure 10:
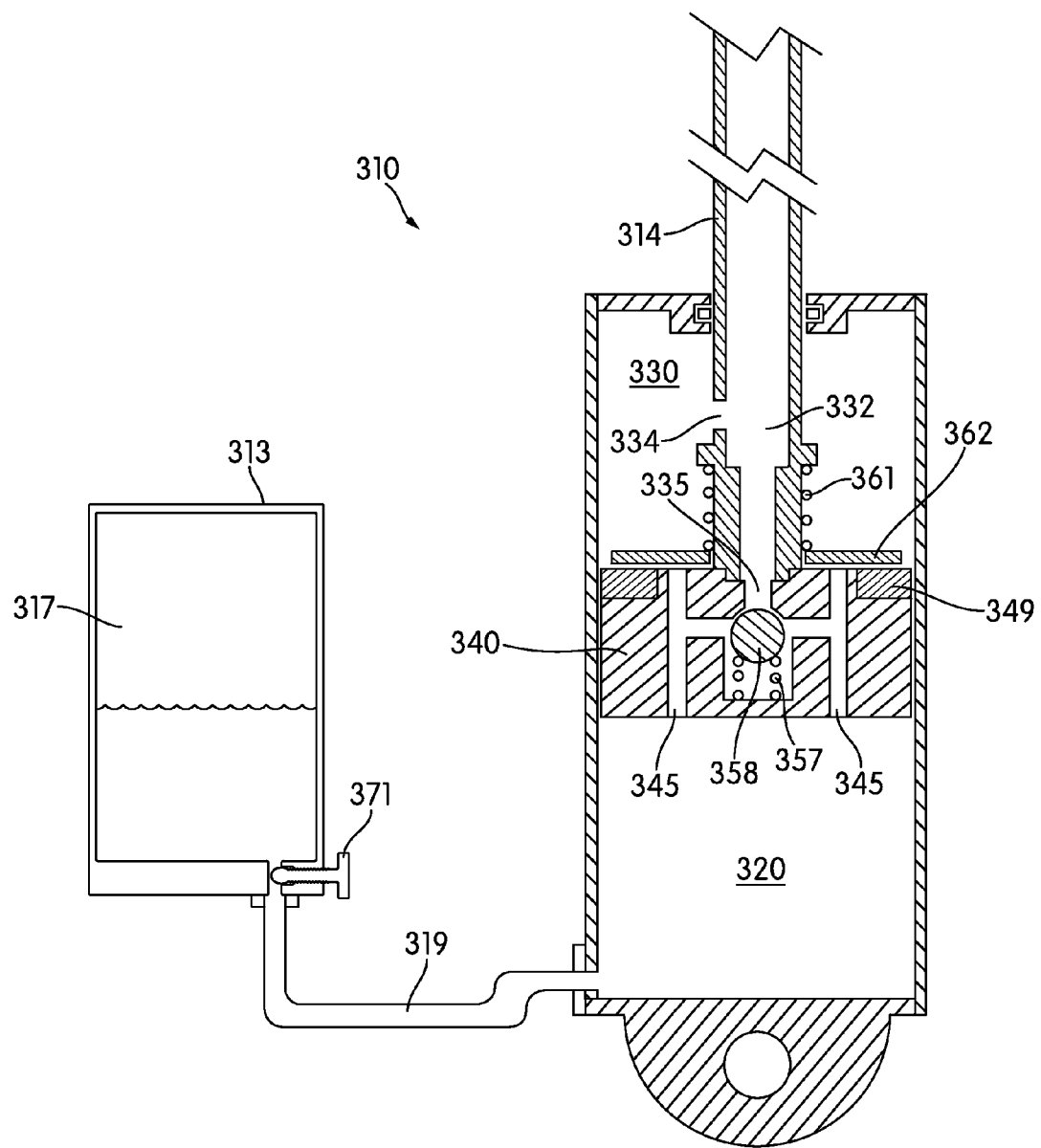
FIG. 10 is a side view in section illustrating the present invention in a shock absorber with a remote reservoir and a screw valve to adjust the hydraulic pressure on the magnetically biased valve element during compression of the shock absorber.

In the alternative embodiment of FIG. 10, many of the same elements of the device of FIG. 1 are present. However, one difference is that the chamber or reservoir 317, containing a gas or compressible medium, rather than being part of the cylindrical housing, is remotely contained in the canister 313 and connected with the housing by the hydraulic hose 319. Also, means for adjusting the response of the magnetically sprung valve consists of the screw valve 371 for regulating flow into the chamber 317, rather than varying the tension of the shim spring 361. The rate at which oil can flow through the ports 345, and therefore the pressure against the shim 362 for any given compressive load on the damper, will vary according to the rate at which oil displaced by the piston rod 314 can flow from the compression chamber 320 into the chamber 317. Thus, by varying the flow rate to and from the chamber 317 by adjusting the screw valve 371, one varies the pressure that can be exerted on the shim 362. One can thereby use the screw valve 371 to modify the performance of the shock absorber 310; in particular whether a given compression force on the shock absorber 310 will exert a sufficient fluid pressure on the shim 362 to exceed the magnetic bias between the shim 362 and the ring 349.

When the rate of flow past the screw valve 371 is relatively restricted, the rate of compression of the damper is slowed, which diminishes the threshold action of the valve due to the magnetic attraction between the ring 349 and the shim 362. This is because, as noted above, the rate of oil flow past the valve 371 affects the rate of oil flow through the ports 345. As the screw valve 371 is opened and the potential rate of flow into and out of the chamber 317 increases, the damping rate of the device under low accelerations and moderate loads decreases only slightly, while the damping rate for higher loads decreases dramatically. As a result of the dynamic interaction between the screw valve 371 and the shim 362, the screw valve 371 constitutes an adjusting means for the magnetically-generated threshold response of the damper. Thus, one can, in effect, adjust the threshold of the valve by adjusting a remote structure, such as the screw valve 371.

Figure 3:
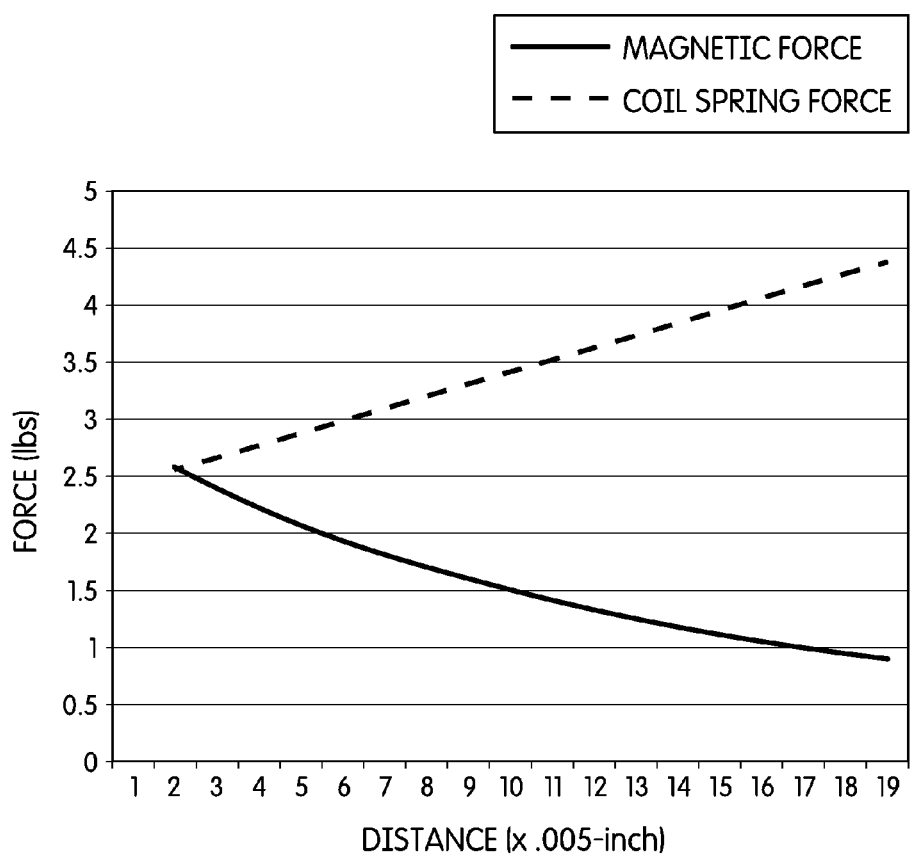
FIG. 3 is a graph of the force of a spring and of a magnet such as might be used to maintain closure of a shock absorber valve.

Referring to FIG. 3, the force of a mechanical (e.g., coil) spring such as might be used to maintain valve closure is plotted alongside that of a magnetic spring. The force acting upon the closed valve in both instances is just over 2.5 pounds. In the case of the coil spring, the opening of the valve will produce further spring compression, and therefore increased force, along a gradient that rises linearly according to the coil's spring rate. An essentially similar plot would obtain for another type of mechanical spring such as a leaf spring, which for shock absorbers ordinarily takes the form of a flexible shim. By contrast, in the case of magnetic force tending to close the valve, as the valve opens the force between the magnetically attracted valve components will diminish as the distance between them increases, in keeping with the familiar inverse cube law governing magnetic field strength. The force tending to close the partially open valve will be reduced to the extent that the force is derived from magnetism as opposed to mechanical spring pressure.

Figure 4:
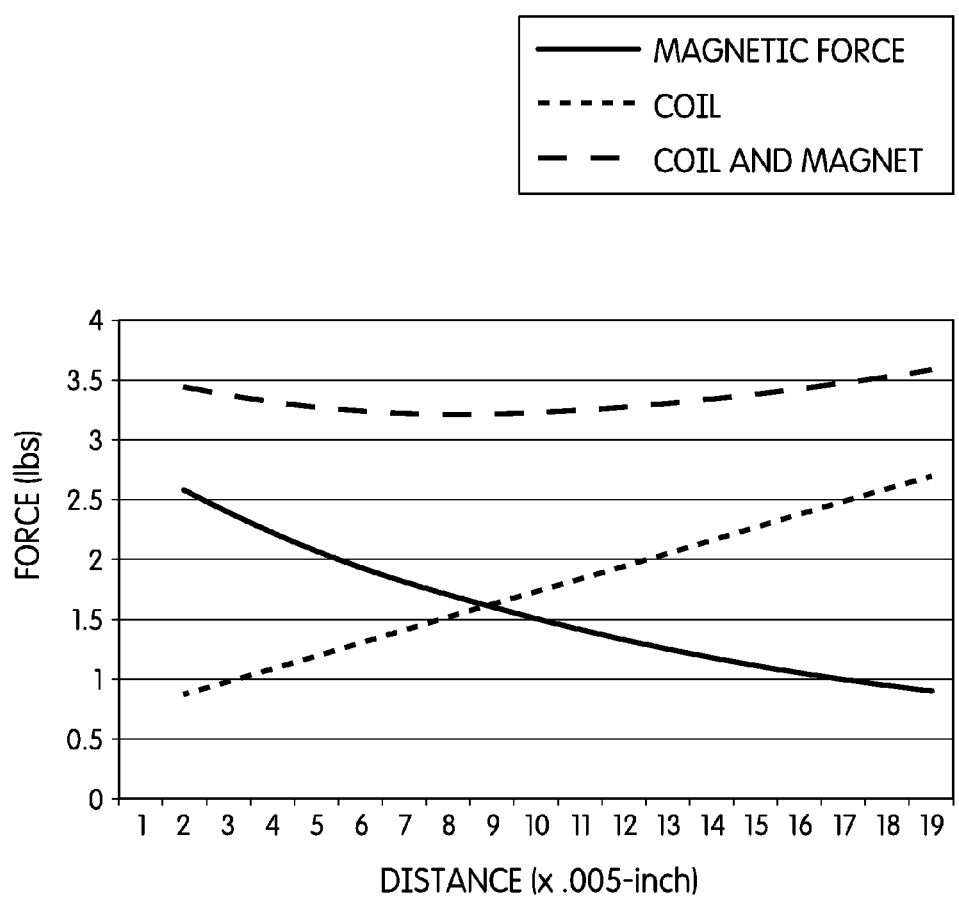
FIG. 4 is a graph of load versus deflection for a coil spring, for a magnetic valve and for a combination of spring and magnetism.

Referring to FIG. 4, plots of spring and magnetic force are shown along with a plot of their combined force as the valve opens. It is apparent that with magnetism contributing significantly to the total force maintaining valve closure, a relatively high initial force can be achieved without a substantial increase in such force as the valve opens. Of course, the extent to which the increase of closure force with valve movement is moderated or eliminated depends on the proportional contribution of magnetism to the total force in any given instance. Some external means of varying this contribution, either in absolute terms or relative to other biasing forces, is preferred to accommodate the suspension to particular loads, speeds and road or trail conditions. Therefore, it is contemplated that any combination of magnetic springs or magnetic and mechanical springs can be used, in combination with mechanical adjustment means to change the distance at which magnetic forces act and/or to vary the tension or spring rate of mechanical biasing means.

Still referring to FIG. 4, relatively high levels of initial valve closure force, such as the starting values for the plots of magnetic and combined coil spring-and-magnetic force, are useful in limiting unwanted chassis movements of a motorized vehicle or up-and-down bobbing of a bicycle rider who is shifting his body weight during pedaling. Such chassis movements involve low accelerations and therefore low peak forces against the damper valve. Only accelerated loads well beyond the initial closure force, like those that accompany the striking of a bump by the vehicle wheel, will open the valve sufficiently to allow free flow.

It will be understood that the invention described herein has application in any vehicle having a suspension that moves relative to the vehicle frame or body, including automobiles, motorcycles, all-terrain vehicles, trucks and bicycles, among others.

Figure 5:
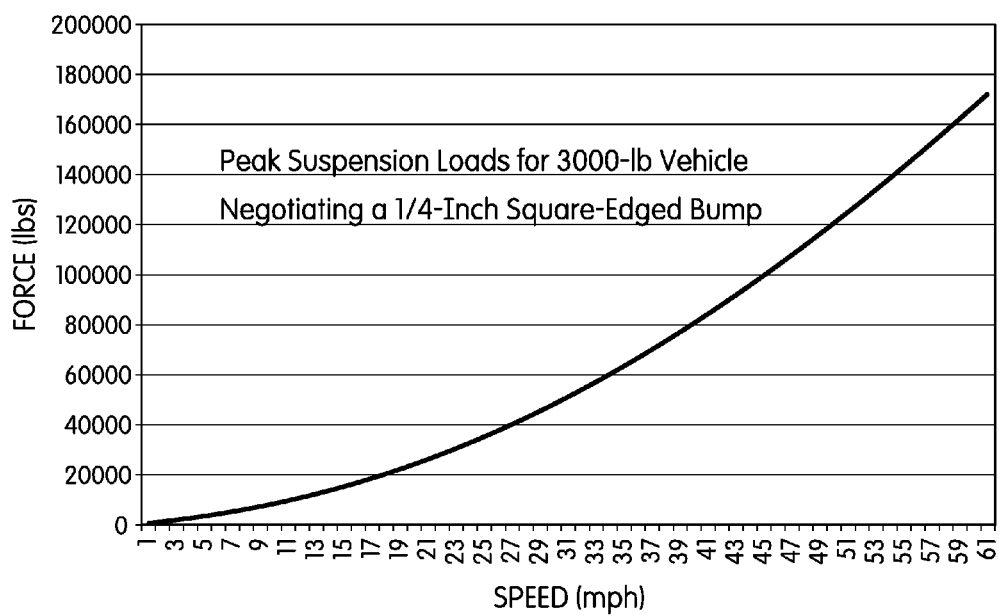
FIG. 5 is a graph of minimum peak suspension loads for a vehicle encountering a bump at various speeds.

Referring to FIG. 5, the graph shows minimum peak loads experienced by a typical automotive suspension (excluding hydraulic leverage effects) during negotiation of a bump ¼-inch in height. The calculation of the average speed, S, in inches per second of wheel/suspension movement during negotiation of a square-edged bump follows the simple formula: $S=(vh)/d \cos \Theta$, where v is the vehicle speed in inches per second (ips), h is the bump height in inches, d is the distance traversed (in inches) in surmounting the bump and $\Theta$ is the angle at which the suspension moves relative to perpendicular with the ground. The formula to determine the minimum acceleration, G, of the suspension during the event is therefore $G=(v/d*S)/384$, where 384 is the value of gravitational acceleration in inches per second squared. G may then be multiplied by the portion of vehicle weight carried over the wheel to determine the minimum peak load for the event.

Still referring to FIG. 5, it is apparent that because of high acceleration values even a small bump taken at modest speed generates peak loads equal to or greater than the portion of vehicle weight carried by a given wheel. By contrast, chassis movements, such as brake dive and body roll, in all but extreme cases involve acceleration of well under 1G and therefore generate loads of a minor fraction of such weight. It follows that suspension damper valves that inhibit chassis movement can remain responsive to bumps if they are sufficiently activated by peak loads. However, it is notoriously difficult to harness damper valve action to peak loads because of the geometry of vehicle suspension.

Figure 6:
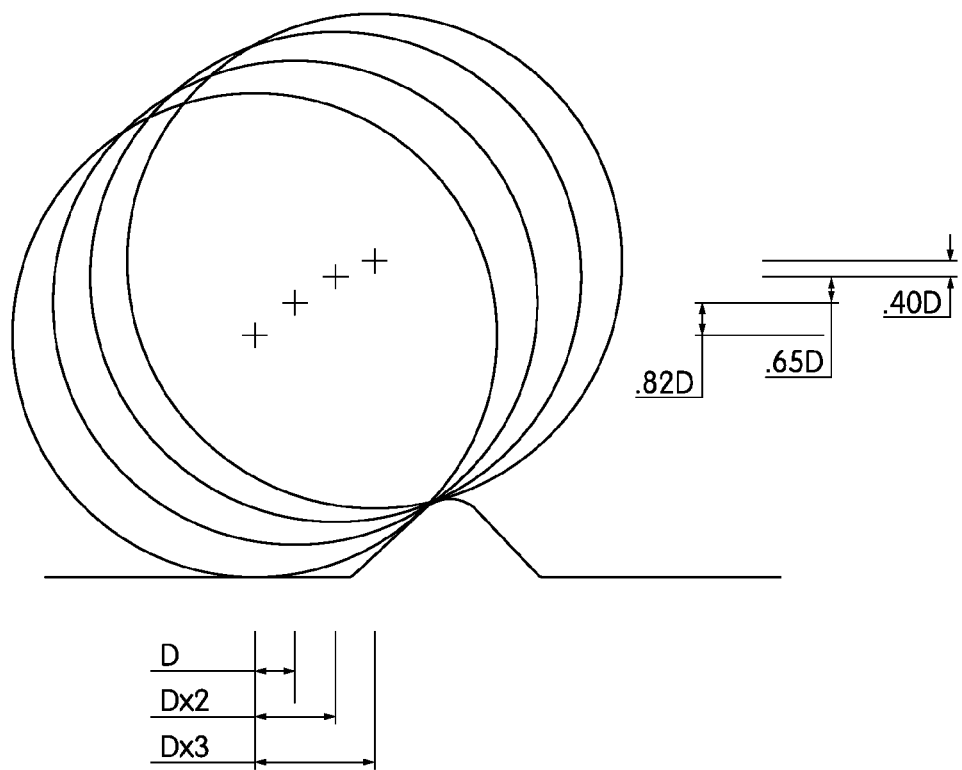
FIG. 6 is a schematic illustration showing the outline of a wheel progressively surmounting a bump with notations of horizontal and vertical displacement.

Referring now to FIG. 6, the vehicle wheel is shown in outline as it progressively moves over a bump. Because the wheel axis effectively rotates along an arcuate path around the apex of the bump, the vertical displacement of the wheel becomes progressively smaller for a given increment of forward movement. Assuming a constant vehicle speed, this means that the telescopic velocity of the suspension is greatest in the first half of the event. Peak force accompanying acceleration occurs at the beginning, nearly instantaneously. If pressure against the damper valve rises steeply as the valve opens, the pressure of the oil flow may be insufficient to hold the valve of the prior art open other than for a small fraction of the time required for traversal of the bump. This is particularly problematic where an initial threshold of valve actuation is desired in order to limit unwanted chassis movement. The more rapidly the valve closes upon dissipation of peak force, the more vertical movement will be transmitted to the vehicle rather than absorbed by the suspension. On the other hand, if closure force on the valve rises only moderately or even decreases as it opens, as with the present invention, hydraulic flow will continue relatively longer and the responsiveness of the suspension will be improved. Thus, with a configuration suitable to an automobile, the invention can be incorporated into an automobile shock absorber, and thereby provide superior ride and handling to conventional shock absorbers.

Figure 7A:
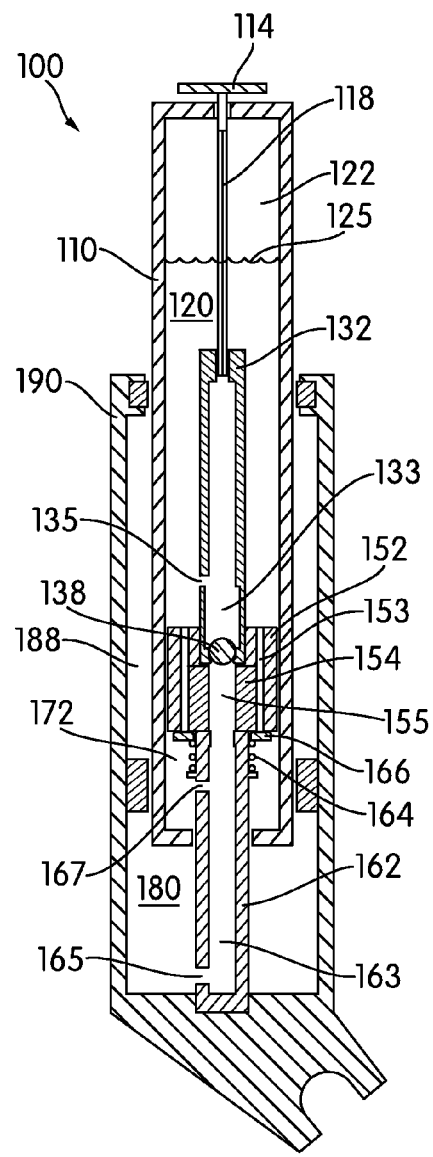
FIGS. 7A & 7B are side views in section illustrating an embodiment of the present invention in a bicycle fork leg.

Referring now to FIG. 7A, the bicycle fork leg 100 comprises the inner leg 110 in telescopic, sliding engagement with the outer leg 190. The compression chamber 180 of the outer leg 190 is filled with hydraulic fluid, the reservoir 125 for which is formed by the cavity 120 of the inner leg 110. (The suspension spring of the fork conventionally would be located in the opposite, parallel fork leg as will be understood by the person having ordinary skill in the bicycle suspension art, but is not shown here.) During compressive movement of the inner leg 110 relative to the outer leg 190, the displacement of fluid into the inner leg cavity 120 is made possible by the compression of a gas or other compressible medium in the space 122 above the fluid level.

The shock absorber damper of the leg assembly comprises the piston 152 and piston rod 162. Upon compression of the fork leg 100, fluid flows from the compression chamber 180 through the port 165, through the passage 163 and the restrictive port 167 in the piston rod 162 and into the rebound chamber 172 of the reservoir 120. However, the volume represented by the section of the inner leg 110 will displace fluid in the compression chamber 180 that cannot be accommodated by the expansion of the rebound chamber 172 and must flow upward through the piston 152 into the cavity 120 in order for compressive movement of the inner leg 110 relative to the outer leg 190 to occur. Because the return ports 153 of the piston 152 are sealed during compression by the rebound shim 166 under the action of the shim spring 164, fluid must flow into the cavity 120 through the passage 155 in the piston insert 154, past the valve ball 138, through the passage 133 in the adjustable valve seat 132 and out through the port 135.

Magnetic attraction between the valve ball 138 and the piston insert 154 directly opposes, and thereby restricts, flow of fluid during compression and consequently inhibits relative compressive movement of the fork leg 100 below a certain threshold of applied force. The magnitude of the closure force acting upon the valve components will be determined by the magnetic field strength of the valve ball 138 and/or piston insert 134 and the mass (or masses) upon which the magnetic field is acting as well as by the distance between the two valve components.

Upon re-extension of the fork leg 100 from a compressed state, fluid in the rebound chamber 172 will flow back to the compression chamber 180 by means of the restrictive port 167, the passage 163 and the port 165. Fluid that flowed past the valve ball 138 will be drawn back below the piston 152 through the return ports 153, since the pressure of the compressed gas or other compressible medium in the space 122 above the fluid level will overcome the upward (in FIG. 7A) pressure of the shim spring 164 against the shim 166.

Figure 7B:
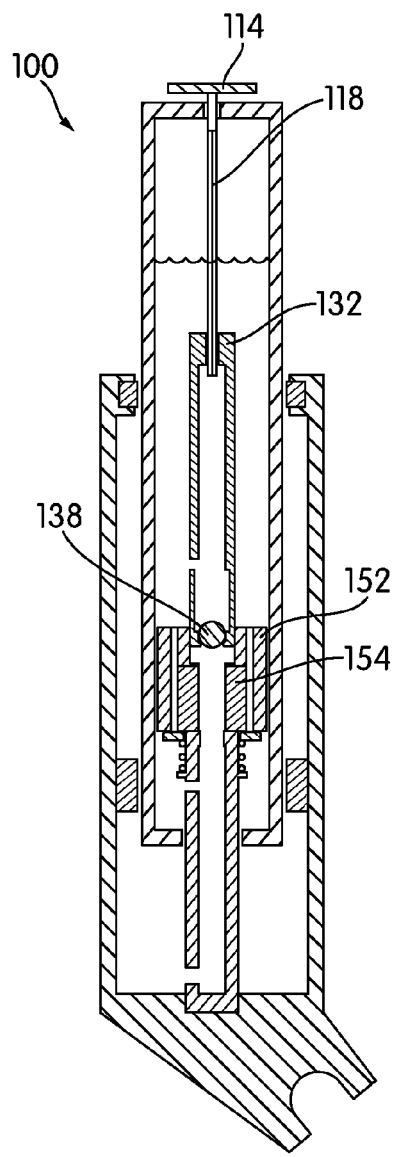

Referring now to FIG. 7B, the bicycle fork leg 100 is shown after an adjustment has been made to vary the closing force on the valve components. The rotatable control knob 114 is connected to the knob key 118, which in turn extends axially slidably through the adjustable valve seat 132. The knob key 118 has a polygonal periphery (such as square or hex) which mates with a corresponding polygonal aperture in the top of the valve seat 132 so that the valve seat 132 may be rotated by means of the knob 114. The valve seat 132 is threadably engaged with the piston 152 so that upon rotation of the valve seat 132 by means of the knob 114 the depth of insertion of the valve seat 132 into the piston 152, and therefore the distance between the valve ball 138 (which is the blocker) and the piston insert 154 (which is the orifice component), may be varied within a given range, as shown by the change in position of the valve components of FIGS. 7A and 7B. Because the level of magnetic closure force acting upon the valve ball 138 is strongly affected by the distance between the valve ball 138 and the piston insert 134, the force threshold for activation of the valve can be adjusted significantly by means of the knob 114. It is evident that any similar mechanical means for altering the distance at closure of the magnetically attracted components will have a similar effect.

Thus, the embodiment of FIG. 7A incorporates the invention, inasmuch as the shock absorber assembly of the fork leg 100 dampens the fluid flow using one or more valves that are held closed at least partially with an adjustable magnetic spring.

It will become apparent that the present invention may be configured so that the spring forces tending to close the valves are adjustable. The preferred embodiment, in which a magnetic and mechanical spring are used, can be adjusted to increase or decrease one spring separately from the other in order to affect the closing forces on the valve at various positions of the valve components relative to the other valve components. Alternatively, a magnetic spring can be used alone. Thus, by adjusting the spring's characteristics, one can achieve a damper valve closure that is maintained by a force that moderates as the valve opens. This retrogressive component of biasing force on the valve dramatically enhances suspension performance.

Figure 11:
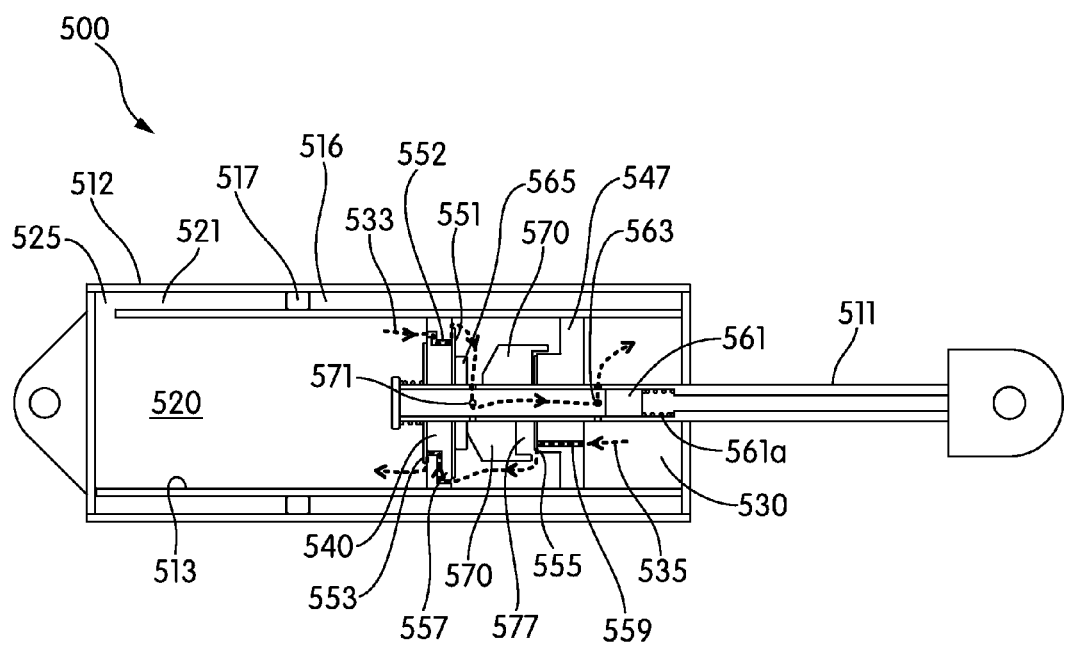
FIG. 11 is a schematic side view in section illustrating the present invention in a shock absorber with an inertia valve, with the top half of the illustration depicting an inertia valve in one position, and the bottom half of the illustration depicting the inertia valve in a second position.

Referring now to FIG. 11, which shows one state in the top half and another state in the bottom half, the shock absorber damper 500 includes the cylindrical housing 512, the piston rod 511 and the piston 540 fixed to the piston rod 511. The second wall 513 of the housing 512 defines the compartment 516 and the reservoir 521 therebetween. A gas in the compartment 516 is separated from the damping fluid in the reservoir 521 by the axially moveable, floating piston 517. Compression and expansion of the gas in the compartment 516 permits the level of fluid in the reservoir 521 (and thus the position of the floating piston 517) to vary with displacement of fluid from the chamber 520 through the port 525 as the piston rod 511 enters the housing.

The shim 551 deforms elastically to permit the compressive flow of fluid through the port 552 as indicated by the arrow given reference numeral 533, but prevents oppositely-directed fluid flow through the port 552. The valve body 561 mounted against the spring 561*a* inside the piston rod 511 permits compressive flow through the port 563 into the rebound chamber 530.

The shims 553 and 555 deform elastically to permit the rebound flow of fluid through the ports 557 and 559 as indicated by the arrow given reference numeral 535, but prevent oppositely-directed fluid flow through the ports 557 and 559.

Affixed to the piston rod 511 is the flange 547. The piston rod 511 extends axially slidably through the inertia valve mass 570 between the piston 540 and the flange 547. When the inertia valve mass 570 is in the closed position, as shown on the lower portion of FIG. 11, the mass 570 blocks the port 571 in the piston rod 511 and prevents or impedes compression of the shock absorber. If acceleration of the piston 540 relative to the cylindrical housing 512 dislodges the inertia valve mass 570 toward the flange 547, as shown on the upper portion of FIG. 11, fluid flows from the compression chamber 520 through the ports 552 and 571, past the valve body 561 and through port 563 into the rebound chamber 530. At the same time, fluid displaced by the volume of the piston rod 511 flows through the port 525 into the reservoir 521.

In some embodiments, the movement of inertial mass 570 may also be affected by the flow of the fluid through the valve. In some embodiments, a chamfer (not shown) may be included in an inside diameter of the inertial mass 570. The amount of force that may be applied through the fluid pressure is, in many embodiments, insufficient to move the valve from the closed to the open position without accompanying inertial force acting on one or more valve components. A person having ordinary skill in the art may select an appropriate size of the chamfer, spring rate, and aperture sizes to tune the ratio of the inertial force to the fluid pressure force that moves the inertial mass 570 relative to the remainder of the valve The ring 565 is affixed to the piston rod 511 adjacent to the shim 551. Either the inertia valve mass 570 or the ring 565 is a magnet, while the other is a magnetically permeable material. Both the inertia valve mass 570 and the ring 565 can be a magnet. Magnetic attraction between the inertia valve mass 570 and the ring 565 maintains the inertia valve mass 570 in the closed position until a bump force of sufficient magnitude on the piston rod 511 dislodges the valve mass 570. The force of magnetic attraction between the valve components (blockers), component mass 570 and orifice component ring 565 may be set so that once the inertia valve mass 570 is dislodged into the open position the magnetism will be insufficient by itself to return the inertia valve mass 570 to the closed position.

Once the inertia valve is open, the mass 570 will remain there until the compression stroke is finished and the shock begins to rebound. After compression, the spring 561a moves the valve body 561 toward the piston 540, closing the port 563. During rebound, fluid is forced through the port 559 and past the shim 555 into the pocket 577 between the inertia valve mass 570 and the flange 547. The flow of fluid through the port 559 and into the pocket 577 under pressure moves the inertia valve mass 570 toward the piston 540 until magnetic attraction between the inertia valve mass 570 and the ring 565 causes the valve mass 570 to be captured in the closed position once again by the magnetic attraction.

It can be seen that the inertia valve mass 570, being maintained in the closed position by magnetism, can be configured to remain open during the entire compression stroke rather than returning to the closed position prematurely as it would tend to do if a coil spring were used to maintain closure. The use of magnetism further permits return of the inertia valve mass to be accomplished by the force of rebound so that the function of the shock is consistent and predictable regardless of the speed, magnitude or frequency of compressions.

Figure 12:
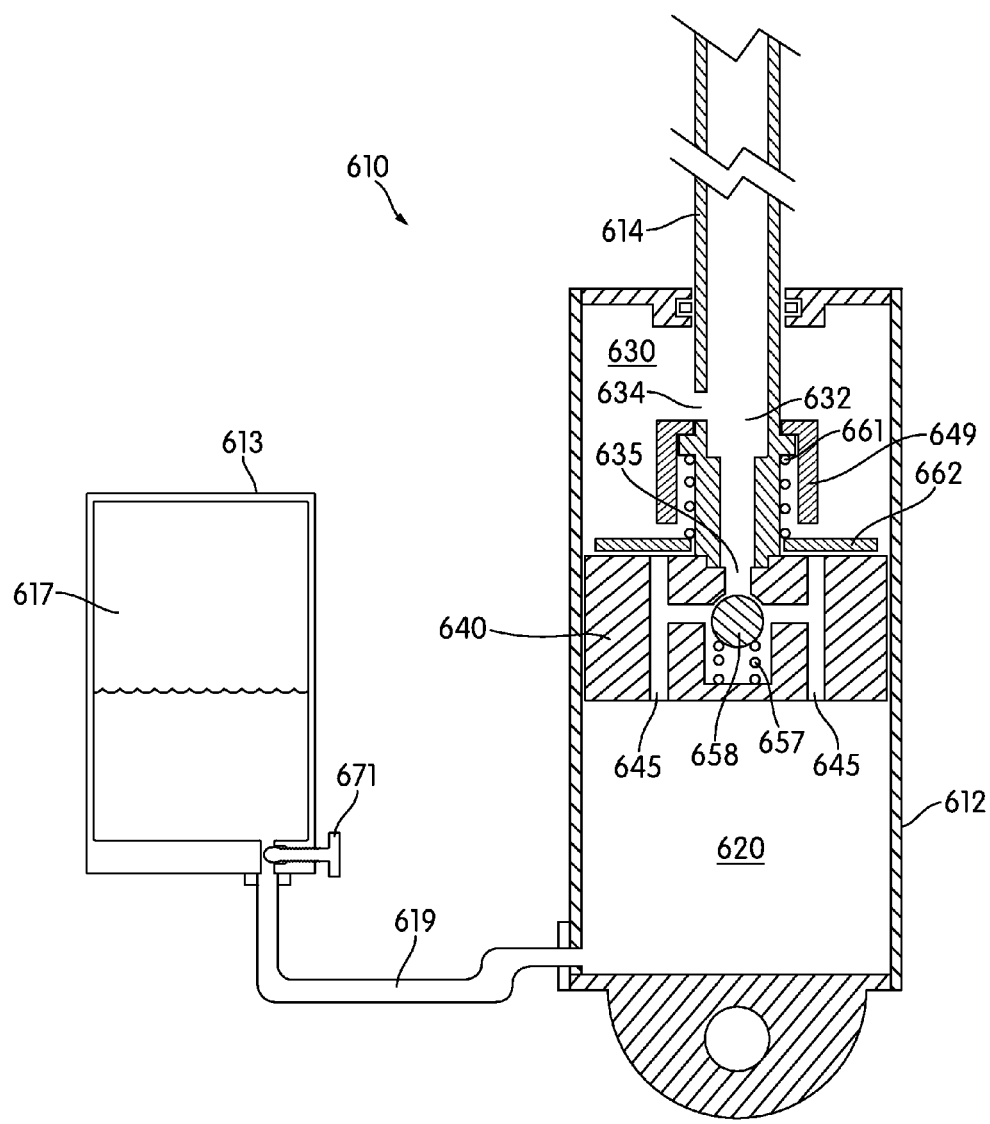
FIG. 12 is a schematic side view in section illustrating an alternative embodiment of the present invention.

In the alternative shock absorber damper 610 of FIG. 12, many of the same structural elements of the shock absorber dampers of FIGS. 1 and 10 are present, including a cylindrical housing 612, a piston rod 614, a rebound chamber 630 and a piston 640. A compression shim 662 that has a magnetically permeable material, preferably steel, is part of the valve and is biased into the closed position, shown in FIG. 12, by a coil spring 661. Unique to the FIG. 12 embodiment is the opener component, preferably the magnetically permeable ring 649, which is preferably a permanent magnet rigidly mounted to the piston rod 614 at a point spaced from the orifices of the ports 645. The magnetic attraction between the shim 662 and the ring 649 urges the shim 662 toward the open position as described in detail below.

The spring 661 urges the shim 662 in sealing contact against the piston 640, thereby blocking or severely restricting oil flow through the ports 645 below a threshold of hydraulic pressure in the compression chamber 620. The shim 662 thus serves as an orifice blocker of the valve. The bias force closing the valve is not magnetic attraction, as in the embodiment of FIG. 1, but preload of the coil spring 661. Of course, magnetic attraction could serve as part of the bias tending to close the valve, but this is not preferred in the embodiment of FIG. 12. Under low compressive loads on the shock absorber, such as those accompanying inertial forces on the vehicle chassis, the shim 662 significantly restricts oil flow through the ports 645. Under the higher loads that accompany bumps at speed, the shim 662 begins to open as it compresses the spring 661. This permits fluid flow through the ports 645 and rapid compression of the shock absorber.

As the spring 661 is compressed during displacement of the shim 662 away from the closed position shown in FIG. 12, an increasing force is required to compress the conventional coil spring 661 an increasing distance. Stated differently, the farther the spring 661 compresses, the greater the force that the spring 661 exerts on the shim 662 tending to close the shim 662. In conventional shock absorbers, this phenomenon would cause the valve to close rapidly before completion of the event that opened the valve. With the invention, however, this is not so due to the sleeve 649 and its cooperation with the shim 662.

Magnetic attraction between the shim 662 and the magnetic sleeve 649 urges the shim 662 toward the open position and opposes the bias force of the coil spring 661. As the shim 662 is displaced away from the piston 640 and closer to the sleeve 649, the magnetic attraction increases, thereby effectively mitigating or canceling, depending upon the amount of magnetic attraction and the characteristics of the attraction, the increase in valve-closing force due to the spring 661. This allows the fluid to flow through the ports 645 for a relatively longer time during compression, which diminishes the transference of motion to the vehicle as the bump is traversed.

The velocity at which the piston rod 614 can re-extend after compression is governed by the rate at which oil can flow from the rebound chamber 630 into the hollow cavity 632 of the piston rod 614, through the orifice 635 of the piston 640, past the valve ball 658 (as the closing pressure of the valve spring 657 is overcome), and through the ports 645 into the compression chamber 620. As in the device of FIG. 10, the alternative embodiment of FIG. 12 has an oil reservoir, which can be the separate container shown in FIG. 12, or alternatively can be formed within the housing, as in the embodiment of FIG. 1. Oil flows from the compression chamber 620 through the hydraulic hose 619 to the reservoir 613 to accommodate displacement of fluid by the piston rod 614. By regulating the rate of this fluid flow, the screw valve 671 also regulates the response of the shim 662 to compressive loads, and therefore the threshold action of the shock absorber damper 610.

A further alternative embodiment is shown in FIGS. 13-16 and 27. In the embodiment shown in FIGS. 13-16 and 27, the damper is shown as being remote from the piston. In many embodiments, it may be desirable to position the damper other than within the piston. Such a damper could be positioned in different positions relative to, for example, two reservoirs. While the damper shown in FIGS. 13-16 and 27 is shown adjacent an end of a cylinder, generally between a reservoir chamber and a compression chamber, it could instead be positioned in another location. For example, it could be positioned in a tube between a reservoir chamber and a compression chamber, similar to that shown in FIG. 10. Alternatively, it could be positioned further from an end of a cylinder, thereby dividing the cylinder into three chambers, such as two compression or two rebound chambers or effectively increasing the size of the reservoir chamber. A person having ordinary skill in the art is capable of positioning the damper shown in FIGS. 13-16 and 27 or any of the remaining dampers in a variety of positions within the system in order to create the damping conditions desired.

In the embodiment shown in FIGS. 13-16 and 27, the valve 1300 may be positioned between and in fluid communication between a first chamber 1302 and a second chamber 1304. In the illustrated embodiment, the first chamber 1302 is illustrated as being a reservoir chamber and the second chamber 1304 is illustrated as being a compression chamber. However, the valve 1300 could be positioned between any two chambers as desired by a person having ordinary skill in the art.

Figure 15:
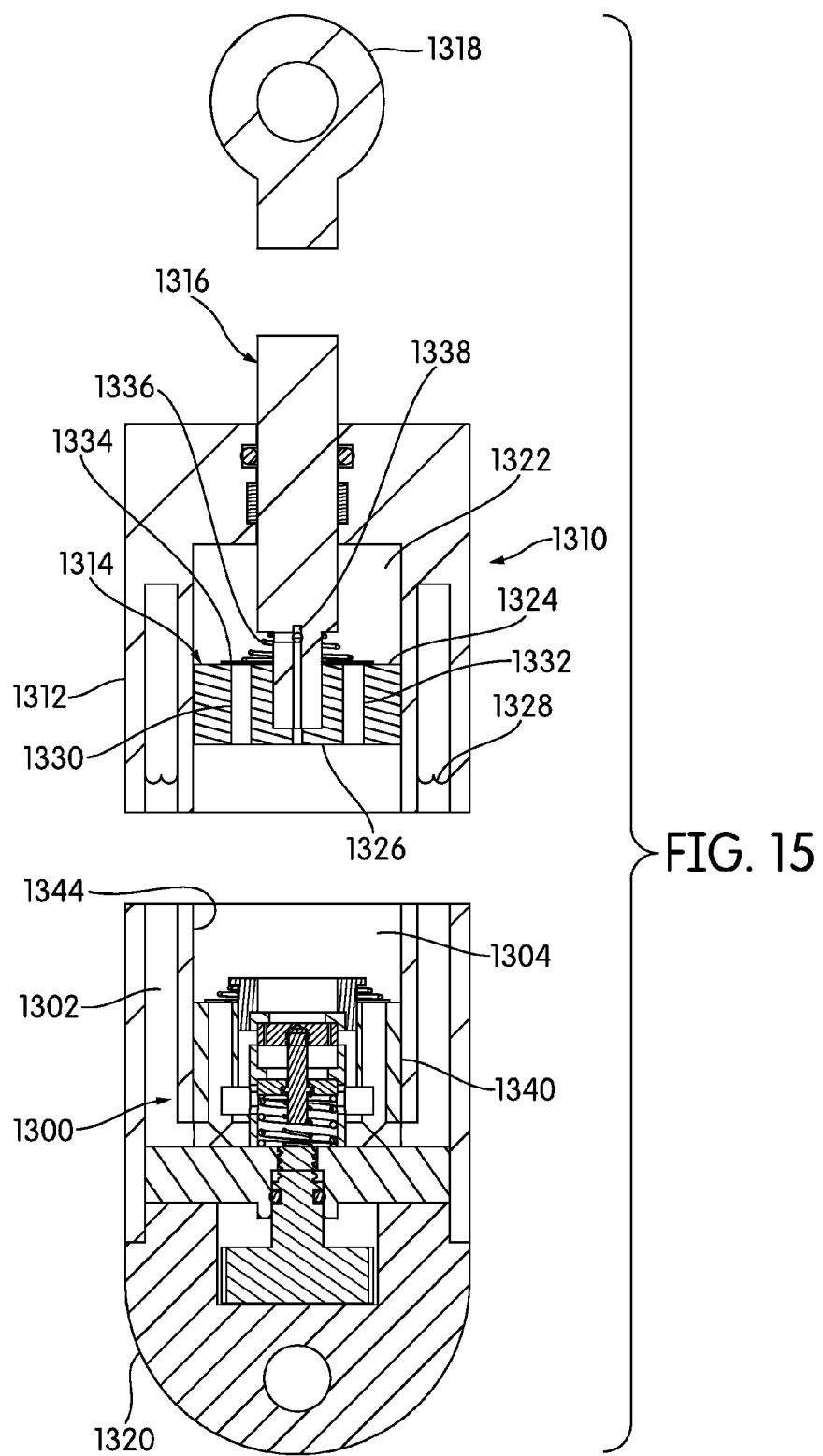
FIG. 15 is a partial side view in section of the embodiment of FIG. 13 shown in an exemplary shock absorber.
Figure 16:
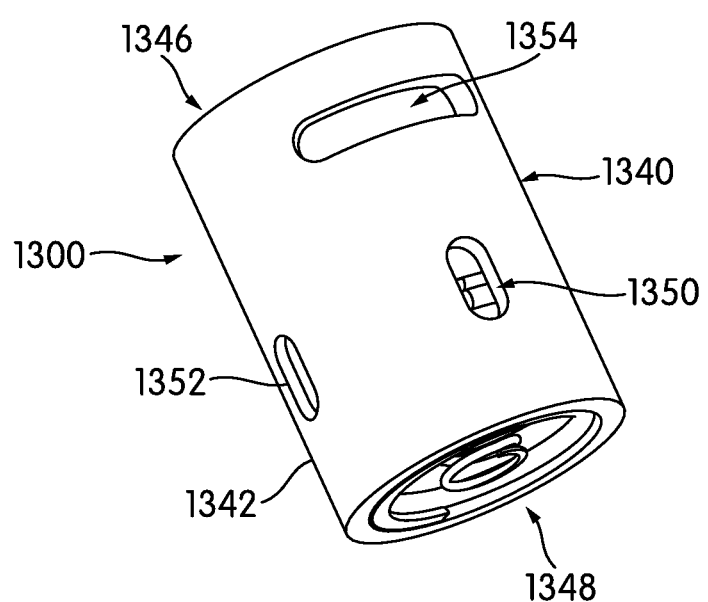
FIG. 16 is a perspective view of an outer portion of the valve of FIG. 13.

As shown in FIG. 15, the valve 1300 may be positioned within shock absorber 1310. The shock absorber 1310 may include a variety of conventional elements, such as a cylindrical housing 1312, a piston 1314 positioned within the cylinder 1312 generally between the compression chamber 1304 and a rebound chamber 1322, a rod 1316 connected to a first side 1324 of the piston 1314 and configured to be attached at a free end 1318 to a vehicle component. The piston 1314 may have a first side 1324 that faces the rebound chamber 1322 and a second side 1326 that faces the compression chamber 1304. The cylinder 1312 may also have a second free end 1320 that may be configured to be attached to another vehicle component. In many embodiments, the rebound chamber 1322, the compression chamber 1304, and the reservoir chamber 1302 may be partially or completely filled with a fluid 1328. In the embodiment illustrated in FIG. 15, the fluid 1328 is a liquid that substantially fills each of the compression chamber 1304 and the rebound chamber 1322 and partially fills the reservoir chamber 1302. In other embodiments, the fluid 1328 may be a gas, such as a pressurized gas. The cylindrical housing 1312 and the other elements of the shock absorber 1310 apart from the valve 1300 may be modified in any manner desired by a person having ordinary skill in the art to achieve various design and functional purposes as may be desirable in a particular commercial or experimental application.

In the embodiment shown in FIG. 15, the piston 1314 is illustrated as including a valve structure. When the vehicle encounters an impact, the first free end 1318 and second free end 1320 of the shock absorber 1310 move toward one another. This causes the piston 1314 to slide relative to the cylinder 1312. In the orientation shown in FIG. 15, the piston 1314 slides downwardly. In many embodiments, the cylinder 1312 is oriented generally vertically or within a 45 degree angle of vertical, but such an orientation is not necessarily required in all embodiments.

When the piston 1314 is moved from its illustrated location to another position, it may be necessary or desirable for some of the fluid 1328 to be moved from the compression chamber 1304 to the rebound chamber 1322. To this end, the piston 1314 may define at least one bore 1330 that extends from the first side 1324 of the piston 1314 to the second side 1326 of the piston 1314, thereby allowing fluid communication between the compression chamber 1304 and the rebound chamber 1322. In some embodiments, such as the embodiment illustrated in FIG. 15, a second bore 1332 may similarly extend from the first side 1324 of the piston 1314 to the second side 1326 of the piston 1314, thereby allowing fluid communication between the compression chamber 1304 and the rebound chamber 1322. Any number of bores may be included as may be desired by any given designer. In some embodiments, such as the illustrated embodiment, a biased shim may be positioned on one side of the piston 1314, to allow fluid to flow in only one direction through the bores. In the illustrated embodiment, an annular shim 1334 is biased by a spring 1336 to allow the fluid 1328 to pass from the compression chamber 1304 to rebound chamber 1322 when the fluid pressure exceeds the spring pressure on the shim 1334, but minimizes fluid flow in the opposite direction. Fluid flow in the opposite direction may be permitted through a different cavity. In the illustrated embodiment, a cavity 1338 passes through the rod 1316 and a central area of the piston 1314, thereby allowing the fluid 1328 to pass from the rebound chamber 1322 to the compression chamber 1304. In the illustrated embodiment, no restriction is placed on fluid flow within the cavity 1338. A person having ordinary skill in the art will be able to determine whether fluid flow should be restricted in one or both directions depending on the desired performance characteristics of the shock absorber 1310.

The performance characteristics of the shock absorber 1310 may also be changed or enhanced through the use of the valve 1300 illustrated in greater detail in FIGS. 13, 14, 16, and 27. As shown most clearly in FIG. 16, the valve 1300 may include a valve housing 1340. In many embodiments, such as the one shown in FIG. 16, the valve housing 1340 may be a cylindrical tube. Many of the valve components may be contained within the valve housing 1340, while others may project outwardly from a first open end 1346 or second open end 1348 of the valve housing 1340. As may be noted in FIG. 16, a plurality of apertures may be defined through the valve housing 1340. In the embodiment shown in FIG. 16, there is defined a first lower aperture 1350, a second lower aperture 1352, and a first upper aperture 1354. It will be understood by a person having ordinary skill in the art that on the side of the valve housing 1340 that is not visible in FIG. 16, there may be one or more additional lower apertures and one or more additional upper apertures.

In one embodiment, there may be four total lower apertures and two total upper apertures. As shown, each aperture may be generally oval or oblong in shape. The lower apertures may be positioned generally perpendicular to the upper apertures. The upper apertures may be larger than the lower apertures. However, these shapes and sizes are merely exemplary and other shapes and sizes may be used. For example, the apertures could instead be rectangular, circular, or diamond shaped. In another embodiment, the apertures could be the same size and shape, but a greater number of apertures could be used in different positions. A person having ordinary skill in the art is able to adjust the number, size, shape, and position of the apertures to create a desired fluid flow, as will be described in greater detail herein.

Figure 13:
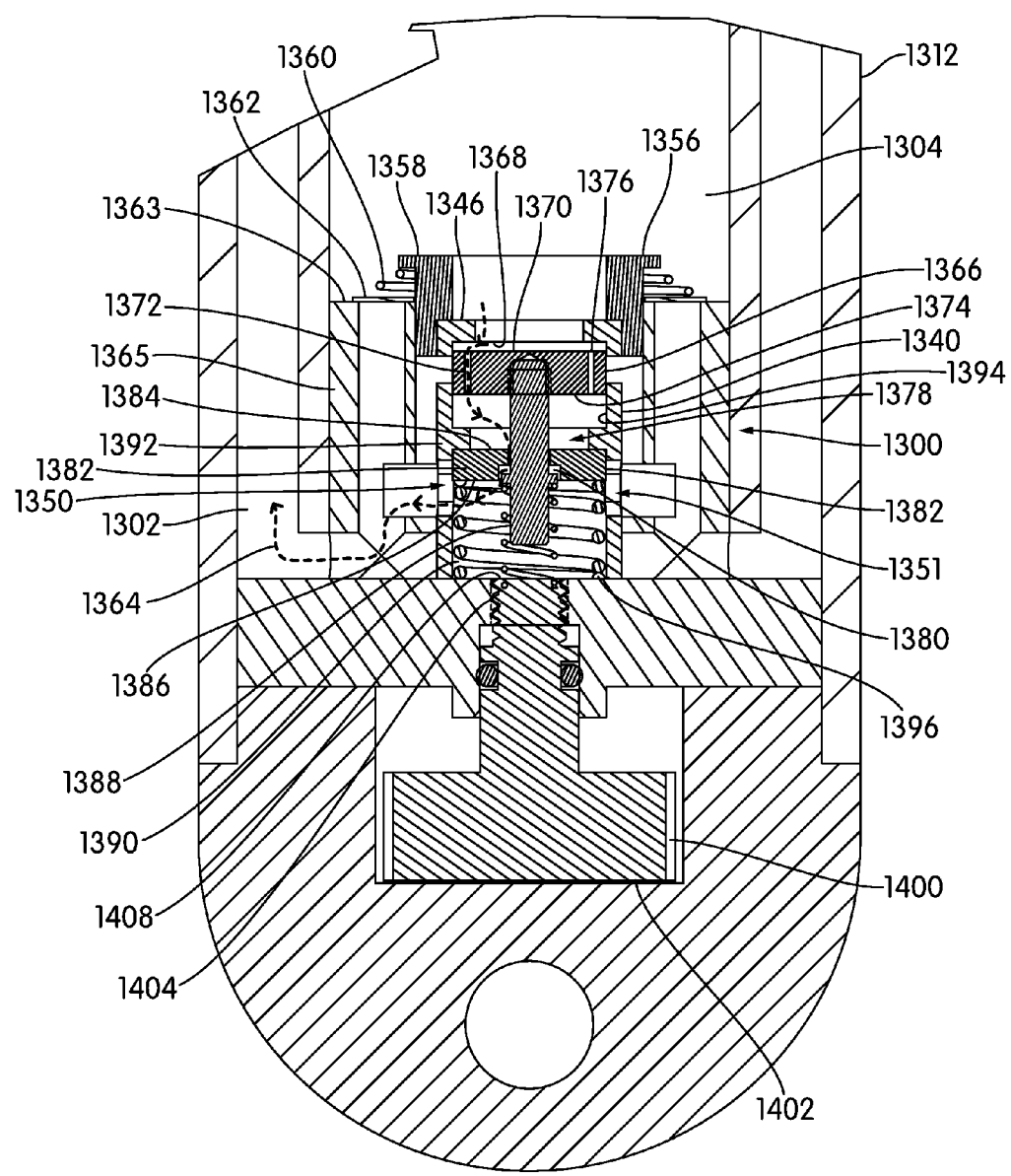
FIG. 13 is a side view in section illustrating an alternative embodiment of the present invention in a first position.
Figure 14:
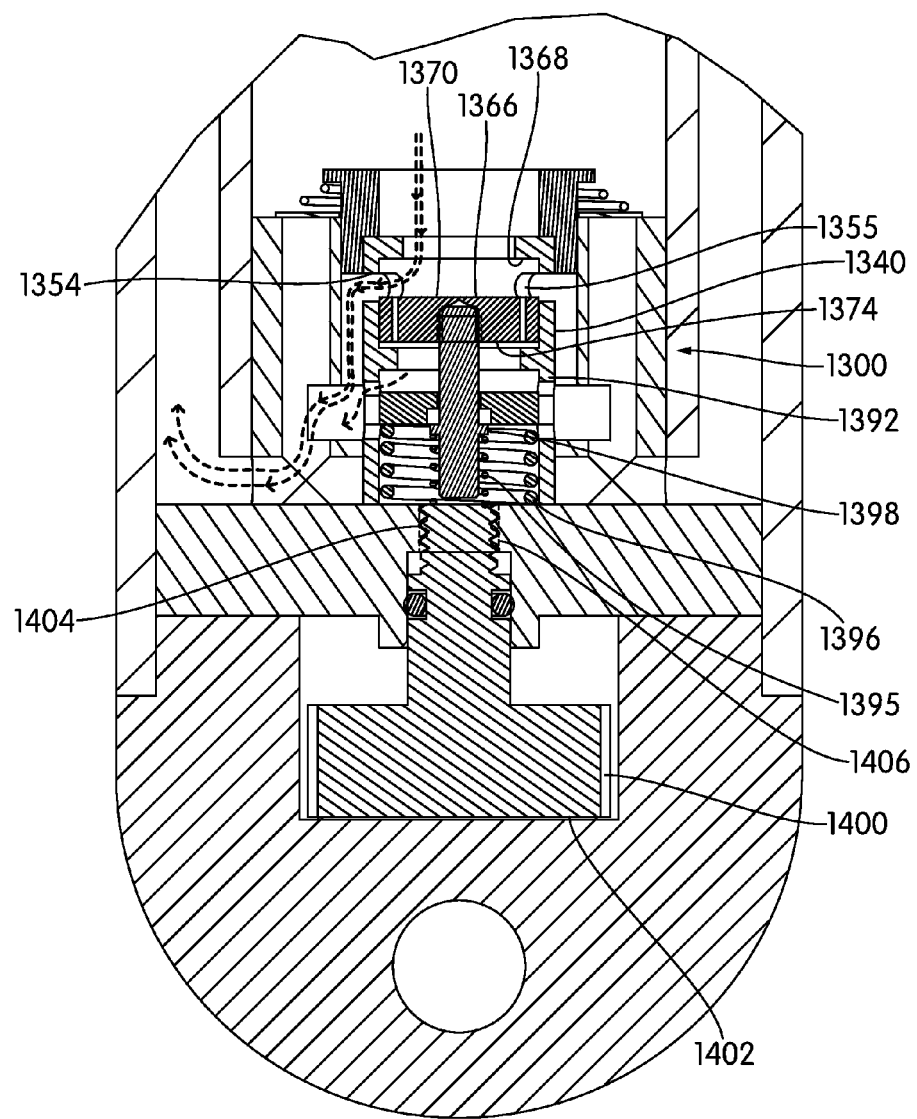
FIG. 14 is a side view in section of the embodiment of FIG. 13 in a second position.
Figure 27:
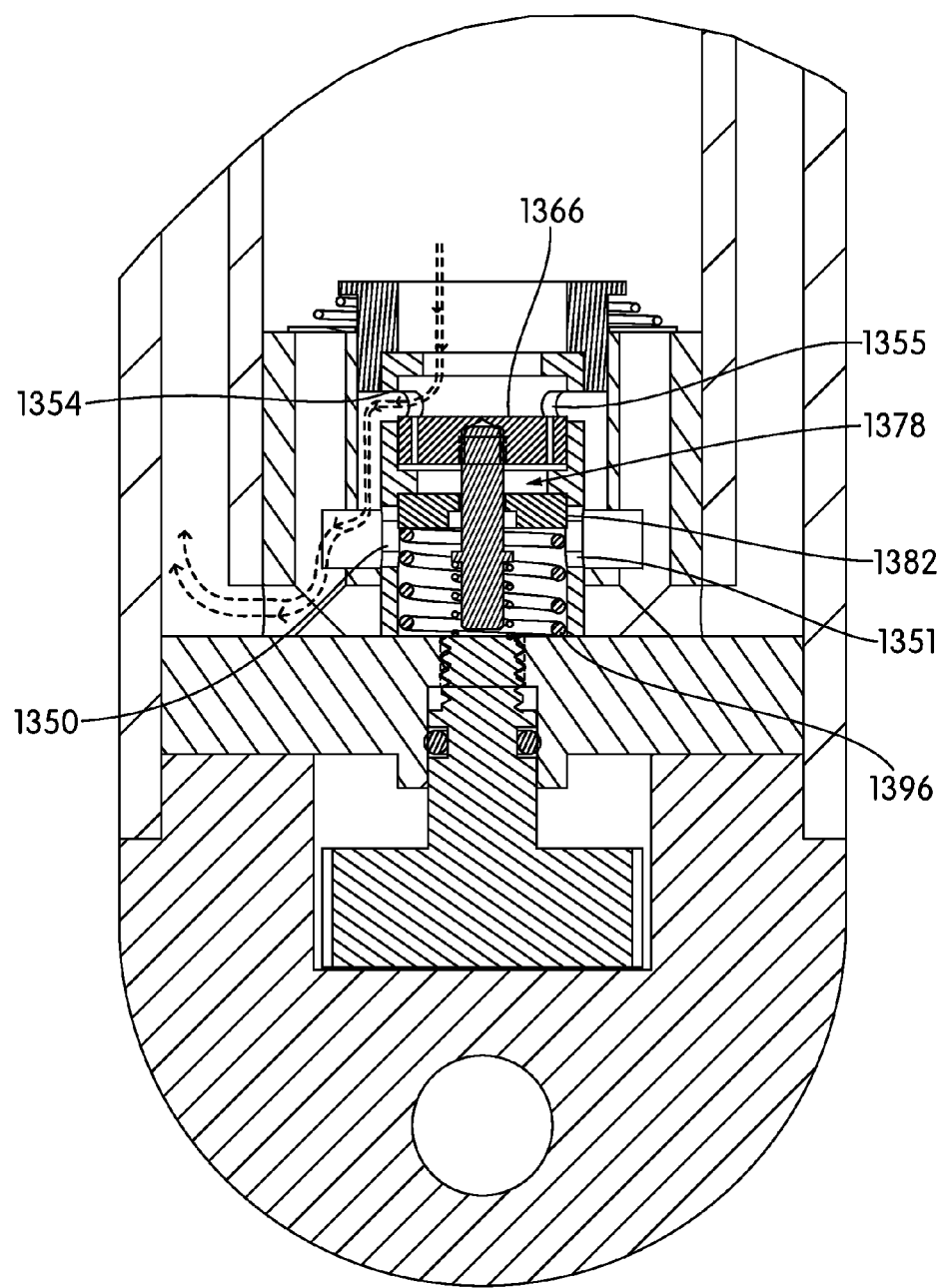
FIG. 27 is a cross-sectional view of the embodiment of FIG. 13 in a third position.

In a rest position shown most clearly in a comparison of FIGS. 13-15 and 27, a first surface 1370 of the valve piston 1366 may rest against an underside 1368 of the upper surface 1346 of the valve cylinder 1340. FIG. 15 shows a rest position of the valve piston 1366. FIG. 13 shows the position and function of the valve piston 1366 at the beginning of a compression stroke. FIG. 14 shows the position and function of the valve piston 1366 at a later portion of a compression stroke. FIG. 27 shows the position and function of the valve piston 1366 at still a later portion of the compression stroke.

Some auxiliary parts of the valve are seen most clearly in FIG. 13. At the first free end 1346 of the valve body, there may be positioned an annular stop 1356. The annular stop 1356 may be made of a resilient material, such that if the vehicle encounters a large obstacle and the piston 1314 moves the full length of the cylindrical housing 1312, it will impinge on the annular stop 1356. The use of such a stop may be helpful in minimizing or preventing damage to the piston 1314, the valve 1300, and the shock absorber 1310 as a whole. In some embodiments, it may be desirable to secure the annular stop 1356 to the valve housing 1340.

FIGS. 13, 14 and 27 illustrate the flow of fluid 1328 through the valve 1300 upon a compression stroke of the shock absorber 1310. When the piston 1314 begins to descend through the cylindrical housing 1312, as shown in FIG. 13, some fluid 1328 may be displaced from the compression chamber 1304 into the rebound chamber 1322, as was earlier described. However, some fluid 1328 equal to the volume displaced by the progressive entry of the rod 1316 into the interior cavities of the shock absorber housing may also be displaced from the compression chamber 1304 into the reservoir chamber 1302. As is shown by the fluid flow arrow 1364, the fluid 1328 may follow a serpentine pathway to flow through the valve 1300 from the compression chamber 1304 into the reservoir chamber 1302. As is shown in FIG. 13, at the beginning of a relatively weak compression stroke like that due to chassis movement, pressure from the fluid 1328 may cause the valve piston 1366 to be slightly displaced, so that the first side 1370 of the valve piston 1366 may become spaced from the lower surface 1368 of the valve body 1340. This spacing of the valve piston 1366 and the valve body 1340 may expose a first bore 1372 that passes through the valve piston 1366 from a first side 1370 to a second side 1374. In some embodiments, such as that shown in FIG. 13, a second bore 1376 may also be exposed and may also pass through the valve piston 1366 from a first side 1370 to a second side 1374.

Due to the very small areas available for fluid 1328 to pass from the compression chamber 1304 through the bore 1372 or the bore 1376, only a small volume of the fluid may enter a first valve interior chamber 1378. The first valve interior chamber 1378 may be of any shape and size deemed desirable by a person having ordinary skill in the art. After passing through the first valve interior chamber 1378, the small volume of fluid 1328 may pass through a bore 1380 in a secondary valve piston 1382. As is shown in FIG. 13, in a rest position, the secondary valve piston 1382 may rest against a stop, such as annular stop 1392 that may project from an interior surface 1394 of the valve body 1340. The bore 1380 may pass from a first side 1384 of the secondary valve piston 1382 to a second side 1386 of the secondary valve piston 1382. In the embodiment illustrated in FIGS. 13-16 and 27, the bore 1380 is illustrated as being an annular bore that is adjacent the valve piston pin 1388, but the bore 1380 could be placed elsewhere in the secondary valve piston 1382 as may be desired by a designer. The placement, size and shape of the bore 1380 or combination of bores may govern the minor fluid flow through the secondary valve piston 1382 and the fluid pressure on the top surface 1384 of the secondary valve piston 1382.

After the fluid 1328 flows through the bore 1380, it may enter a second valve interior chamber 1390. As is shown in FIG. 13, the second valve interior chamber 1390 may be in fluid communication with the reservoir chamber 1302 through a lower aperture, such as the lower aperture 1350 or the lower aperture 1351. After flowing through one lower aperture 1350 or another lower aperture 1351, the fluid may enter the reservoir chamber 1302. Because the volume of fluid allowed to pass in this manner is limited, under weak compressions such as those due to movements of the vehicle chassis the damping rate remains high and the shock absorber remains firm.

With higher force compressions such as those resulting from the vehicle wheel encountering a bump, the pressure placed on the valve piston 1366 may increase, as is shown in FIG. 14. As shown in FIG. 14, sufficient pressure from the fluid 1328 may further press the first valve piston 1366 in a downward direction, simultaneously forcing downward the secondary piston 1382 by means of fluid trapped in the cavity 1378 and overcoming the combined bias of the small spring 1395 and the larger spring 1396 to which the first and secondary valve pistons, respectively, are linked. The upper surface 1370 of the first valve piston 1366 may become further spaced from the inner surface 1368 of the valve body 1340 by the higher compression forces. As this spacing increases, the lower surface 1374 of the first valve piston 1366 may impinge on a stop, such as annular stop 1392, which may in some embodiments be secured to or formed integrally with the valve body 1340. As the first valve piston 1366 moves downwardly, it may cease blocking a passageway, such as first upper aperture 1354 or a second upper aperture 1355 that may be formed in valve body 1340. A large volume of fluid 1328 may then be permitted to flow in a serpentine pattern from the compression chamber 1304 to the reservoir chamber 1302. As was discussed earlier, in many embodiments the size of one of the upper apertures, such as the first upper aperture 1354 or the second upper aperture 1355, may be significantly greater than the size of one of the lower apertures, such as the first lower aperture 1350 or the second lower aperture 1351. Because of this relative size, more fluid 1328 may be able to pass through an upper aperture 1354, 1355 than through a lower aperture 1350, 1351 at the same pressure in the same amount of time.

As is shown in FIG. 27, after the valve piston 1366 is forced fully open, the fluid 1328 in the space 1378 may substantially evacuate through the ports 1350, 1351. Once the fluid 1328 has been substantially evacuated from the space 1378, the downward force on secondary valve piston 1382 may be reduced. When the downward force is reduced enough, the secondary valve piston 1382 may return to its rest position due to the bias of the large spring 1396. However, because the downward fluid force may remain on the primary valve piston 1366 due to the fluid flow through the upper ports 1354, 1355, and because the amount of fluid 1328 in the intermediate chamber 1378 may be reduced, the primary valve piston 1366 may remain in open position for some duration after the secondary valve piston 1382 has returned to its rest position.

When a cyclist pedals vigorously, weak compressive loads on the shock absorber may be initiated. During an initial phase of the compression stroke thus induced, a certain volume of the fluid 1328 may be permitted to move from the compression chamber 1304 to the reservoir chamber 1302. For such relatively weak compression events, this small amount of fluid may be all that is permitted to flow. In such an event, compression may be somewhat resisted. If the compressive load is larger or more rapidly applied, as when a bump is encountered by the wheel, the compression stroke may allow for quick and compliant vertical travel of the wheel over the bump, due to the opening of the upper openings' release of fluid. In this manner, a useful compression stroke may be tuned and maintained by a person having ordinary skill in the art.

When the piston 1314 has reached the farthest stage of compression that is necessary or possible for the applied force, the piston 1314 then may begin its rebound stroke. During the rebound stroke, a vacuum or a relatively lower pressure relative to the reservoir chamber 1302 may be created in the compression chamber 1304 that encourages the fluid 1328 to return from the reservoir chamber 1302 to the compression chamber 1304. As shown in FIGS. 13 and 14, the annular stop 1356 may include a rim 1358. The rim 1358 may secure a spring 1360 in place adjacent an annular shim 1362. The spring may perform two functions. First, it may help in dissipating force from the piston 1314 if it impinges on the annular stop 1356. In addition, it may hold the annular shim 1362 in place against the top surface 1363 of the reservoir chamber outlet 1365 against forces tending to compress the spring 1360. The shim 1362 may serve as a one-way valve covering an outlet of the fluid 1328 from the reservoir chamber 1302 into the compression chamber 1304, and thus allows return of fluid to the compression chamber 1304 during the rebound stroke. The annular shim 1362 and its related spring 1360 may function in a manner similar to the annular shim 1334 and spring 1336 earlier described. In some embodiments, it may also be desirable to configure the annular shim 1362 and the spring 1360 to function as a pressure release to allow fluid flow away from the valve 1300 in the event of full compression of the piston 1314 against the annular stop 1356. A person having ordinary skill in the art may easily determine, based on the desired performance characteristics, how to set the spring constant on the spring 1360 in order to allow fluid flow past shim 1362 upon a rebound stroke and in the event of overfilling of the reservoir chamber, and in any other conditions the person having ordinary skill in the art may think is desirable. Upon the release of the fluid pressure during the rebound stroke, first valve piston 1366 may return to its rest position through the action of first piston spring 1395.

In addition to tuning a compression stroke through the use of multiple pistons, springs, chambers, bores, and apertures, the compression stroke may be further tuned by the use of magnetism, such as through the use of magnetically attractive or repelling materials within the valve 1300. The use of magnetically attractive or repelling materials within the valve 1300 may cause the movement of one or more of the elements within the valve 1300 to be accelerated or retarded relative to a non-magnetic element. In the previous discussion of the valve illustrated in FIGS. 13-16 and 27, a discussion of possible magnetic elements was omitted in order to clearly show the overall function of the valve 1300. The following discussion provides some illustrations of the incorporation of magnetic elements in the valve 1300. The illustrations are not exhaustive, and a person having ordinary skill in the art may be able to envision additional magnetic elements that may be incorporated into the valve 1300 based on this discussion, all of which are intended to be incorporated into the scope of the claims. As in earlier embodiments, the elements may be described as being permanent magnets and magnetically permeable materials. These magnetically permeable materials may be, for example, a metal, such as steel, or another magnet. The magnetically permeable material may be magnetically attracted to the magnet. The magnet may, in some embodiments, be a non-electromagnetic permanent magnet. Each of these elements may be described below as a magnetic element. A person having ordinary skill in the art will understand from the description that at least one complementary element may desirably be a magnet and the other may be a second magnet or a magnetically permeable material. In many embodiments, the materials may be completely interchangeable, in that either of the elements could be made of the magnetic material and the other of the elements could be made of the magnetically permeable material.

A person having ordinary skill in the art may desire, in some embodiments, to further damp the compression stroke of the shock absorber 1310. If such a damping is desired, the designer may consider forming some or all of the valve body 1340 from a magnetic element.

In one embodiment, the first valve piston 1366 may be made in part or in whole from a magnetic element. The valve body 1340 may be made in part or in whole from a magnetic element. When the valve piston 1366 is positioned in its rest position, where the upper surface 1370 of the valve piston 1366 rests against or near the lower surface 1368 of the upper end 1346 of the valve body 1340, a magnetically attractive force may cause mutual attraction between the first valve piston 1366 and the upper end 1346 of the valve body 1340. Accordingly, when the fluid 1328 begins to press against the upper surface 1370 of the valve piston 1366, the magnetic force may be added to the spring force from the first valve piston spring 1395 resisting downward (in the orientation of FIG. 13) movement of the valve piston 1366. Even after the valve piston 1366 begins to move away from the top surface 1346, some magnetic force may continue to urge the valve piston 1366 upwardly towards the upper surface 1346 of the valve body 1340, which may thereby damp the compression stroke, particularly for small displacements.

The movement of the valve piston 1366 may be further affected if the stop 1392 is a magnetic element. If the stop 1392 is a magnetic element, as the valve piston 1366 approaches the stop 1392, a magnetic attraction may occur between the valve piston 1366 and the stop 1392. This magnetic attraction may accelerate the movement of the valve piston 1366, thereby reducing the damping of the compression stroke past a particular point.

One way in which such a design could be implemented is if the valve body 1340 were made integrally of a magnetically attractive metal and the valve piston 1366 were made partially or completely from a magnet. If such a design were used, the damping or acceleration of the compression stroke could be governed, at least in part, by the relative size of the top surface 1346 of the valve body and the stop 1392. For example, if the damping were more desirable, the top surface 1346 could be made larger and the stop 1392 smaller. The opposite configuration may be desirable if it is more important to accelerate the later portion of the stroke.

The movement of the valve piston may be further or differently affected if other portions of the valve 1300 are made from magnetic elements. For example, piston pin 1388 may project downwardly from the lower surface 1374 of the valve piston 1366. The piston pin 1388 may include an annular rim 1398. The annular rim may contact or engage the first piston spring 1395. In some embodiments, the piston pin 1388 may be made of a magnetic element and the first piston spring 1395 may be made of a magnetic element. In such an embodiment, as the compression stroke forces the valve piston 1366 and the piston pin 1388 downwardly, the upward force on the piston pin 1388 may be counteracted in whole or in part by the increased magnetic attraction between the spring 1395 and the piston pin 1388. This attraction may damp the movement of the piston pin 1388 and the valve piston 1366 in either the compression direction, the rebound direction, or both.

Further, in some embodiments, it may be desirable to allow a user to further tune the action of the shock absorber 1310 by providing a user-available adjustment. In some embodiments, the adjustment may take the form of a rotatable knob 1400 that the user may use to adjust the position of the first piston spring 1395. In some embodiments, the knob 1400 may include a user-manipulable end 1402 and a threaded end 1404. The threaded end 1404 may engage a threaded hole 1406 (see FIG. 14) in one end of the shock absorber. As illustrated, if a user turns the rotatable knob 1400, the threaded end 1404 may be moved to project further inwardly or further outwardly from the interior of the shock absorber 1310, depending on the direction it is turned. In some embodiments, such as that illustrated, the first piston spring 1395 may be secured to or positioned in contact with the threaded end 1404. Accordingly, if the knob 1400 is rotated, the first piston spring 1395 may be compressed or expanded. Such a change to the effective length or pre-compression of the spring 1395 may affect the force necessary for the fluid 1328 to apply to the valve piston 1366 to open the valve 1300 as shown in FIG. 14. Further, a magnetic force may also be used in conjunction with the piston pin 1388 and the knob 1400.

In some embodiments, it may be desirable for the opening and closing of the valve 1300 to be further tuned by magnetic elements incorporated within the piston pin 1388 and the knob 1400. If it is desired to reduce the force necessary for the valve 1300 to open further along on the compression stroke, the piston pin 1388 and the knob 1400 may be configured to be magnetically attracted to one another, thereby increasing the downward force on the valve piston 1366 and partially counteracting the spring force of the first piston spring 1395. In some embodiments, only the top surface 1408 of the threaded end 1404 need be a magnetic element. However, if, as described before, the piston pin 1388 is a permanent magnet, the knob 1400, including the threaded end 1404, could be made of a magnetically permeable material, such as a magnetically attracted metal, thereby causing or allowing a magnetic attraction when the pin 1388 and the threaded end 1404 are positioned adjacent one another. The magnetic attraction between the pin 1388 and the threaded end 1404 may also dampen the closure of the valve 1300 during the rebound stroke.

Magnetism may also be used to affect the movement of the secondary valve piston 1382. As is shown most clearly in FIG. 13, the secondary valve piston 1382, in its rest position, may be positioned against or adjacent the stop 1392. In some embodiments, it may be desirable for the secondary valve piston 1382 and the stop 1392 to be magnetic elements. As discussed above, in some embodiments, it may be desirable for the valve body 1340 to be made from a magnetically attracted metal. In such an embodiment, some or all of the secondary valve piston 1382 may be made from a non-electromagnetic permanent magnet. Upon a compression stroke, the force that the fluid 1328 would have to exert on the top surface 1384 of the secondary valve piston 1382 may be increased, as the force from the fluid 1328 would have to overcome both the force from the secondary valve spring 1396 and the magnetic force between the secondary valve piston 1382 and the stop 1392 in order to move the secondary valve piston 1382 into the position shown in FIG. 14. In addition, on a rebound stroke, the magnetic force between the secondary valve piston 1382 and the stop 1392 may accelerate the upward movement of the secondary valve piston 1382.

In the same or another embodiment, the movement of the secondary valve piston 1382 may also be affected by the secondary valve spring 1396. In some embodiments, for example, the secondary valve spring 1396 may be made of a magnetically attracted metal (a magnetic spring) and the secondary valve piston 1382 may be made in whole or in part from a non-electromagnetic permanent magnet. In such an embodiment, when the force of the fluid 1328 presses the secondary valve piston 1382 downwardly, the magnetic attraction between the secondary valve piston 1382 and the secondary valve spring 1396 may be increased, due to the greater proximity of the secondary valve piston 1382 and the secondary valve spring 1396. This magnetic force may tend to damp the movement of the secondary valve piston 1382 upwardly upon a rebound stroke.

Many possible embodiments of incorporating magnetic elements have been described. A designer or other person having ordinary skill in the art may select any or all of these described. In addition, other magnetic elements could be incorporated into other areas of the valve 1300 to cause further damping of the valve piston movements or the movements of other elements of the valve during the compression and rebound strokes. The designer is able to easily adjust the materials and sizes used to create a desired damping effect without undue experimentation.

Figure 17:
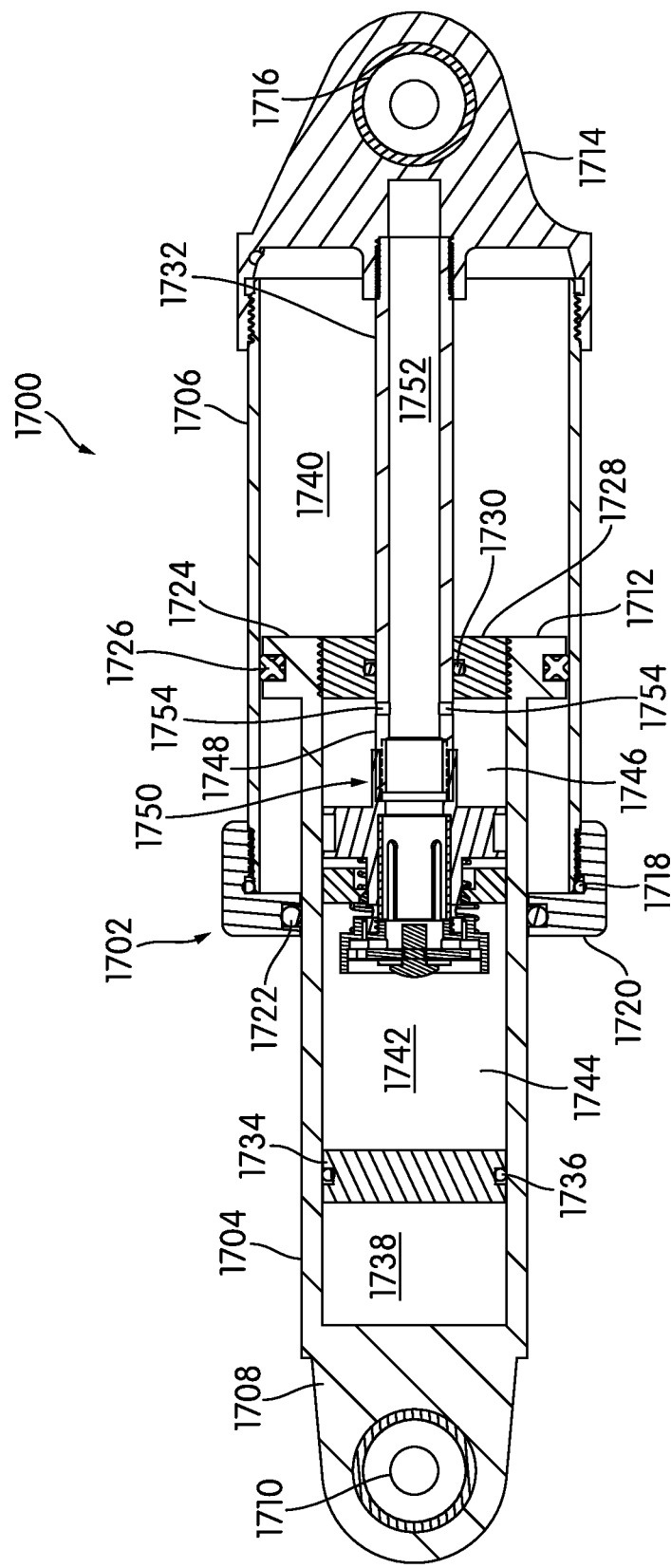
FIG. 17 is a cross-sectional view of an alternative embodiment of a valve in a shock absorber according to the present disclosure.

A further embodiment of a shock absorber 1700 is shown in FIG. 17. In FIG. 17, a valve 1702 may be positioned within a first telescoping member 1704. In some embodiments, some or all of the components of the valve 1702 may also function as a piston. The first telescoping member 1704 may mate telescopically with a second telescoping member 1706. The first telescoping member 1704 and the second telescoping member 1706 may be cylindrical. The first telescoping member 1704 may include a closed end 1708, which may further include an eyelet 1710 for securing to a bicycle frame (not shown) or other suspended vehicle part (not shown). The first telescoping member 1704 may also include an open end 1712. Similarly, the second telescoping member 1706 may include a closed end 1714, which may further include an eyelet 1716 for securing to a wheel or unsuspended vehicle part such as a swing arm (not shown). The second telescoping member 1706 may also include an open end 1718. The open end 1718 may be configured to receive the first telescoping member 1704 and may include a cap 1720. A bearing 1722 may be included to allow for relative sliding motion of the first telescoping member 1704 and the second telescoping member 1706. Similarly, the open end 1712 of the first telescoping member 1704 may include a flange 1724 including a bearing 1726 for permitting relative sliding motion of the first telescoping member 1704 and the second telescoping member 1706. The open end 1712 may be closed by a seal 1728 that may further include a bearing 1730 to permit relative sliding motion of the first telescoping member and a central shaft 1732. The first telescoping member 1704 may further include a floating barrier 1734 that may further include a bearing 1736 to permit relative movement of the barrier 1734 within the first telescoping member 1704. In some embodiments, each of the bearings 1722, 1726, 1730, and 1736 may include an o-ring or a quad-ring seal. The barrier 1734 may separate the first telescoping member into two cavities. The first, closed cavity 1738 may be positioned between the barrier 1734 and the closed end 1708. In many embodiments, the first cavity 1738 may be filled with air or another compressible fluid. The use of such a cavity may allow for entry of fluid displaced by a change in total volume of other cavities during movement of the telescoping members relative to one another. It also may allow further damping of a compression stroke of the shock absorber 1700 than a structure where such a cavity 1738 is absent, as pressure or force against the floating barrier 1734 may be at least partially absorbed by the compressible fluid in the cavity 1738, and that force may then be dissipated on the rebound stroke. The cavity 1740 within telescoping member 1706 may similarly be filled with a compressible fluid, such as air, to absorb force from and return force to the open end 1712 and seal 1728 during the compression and rebound strokes.

The remaining cavity 1742 in the first telescoping member 1704 may be filled with a compressible or incompressible fluid. In many embodiments, a hydraulic fluid may be used. The fluid selected may be designed to function appropriately with the valve 1702, which will be described in further detail below. The valve 1702 may be configured to allow the fluid to flow from a rebound chamber 1746 to a compression chamber 1744 and to return to the rebound chamber.

Figure 18:
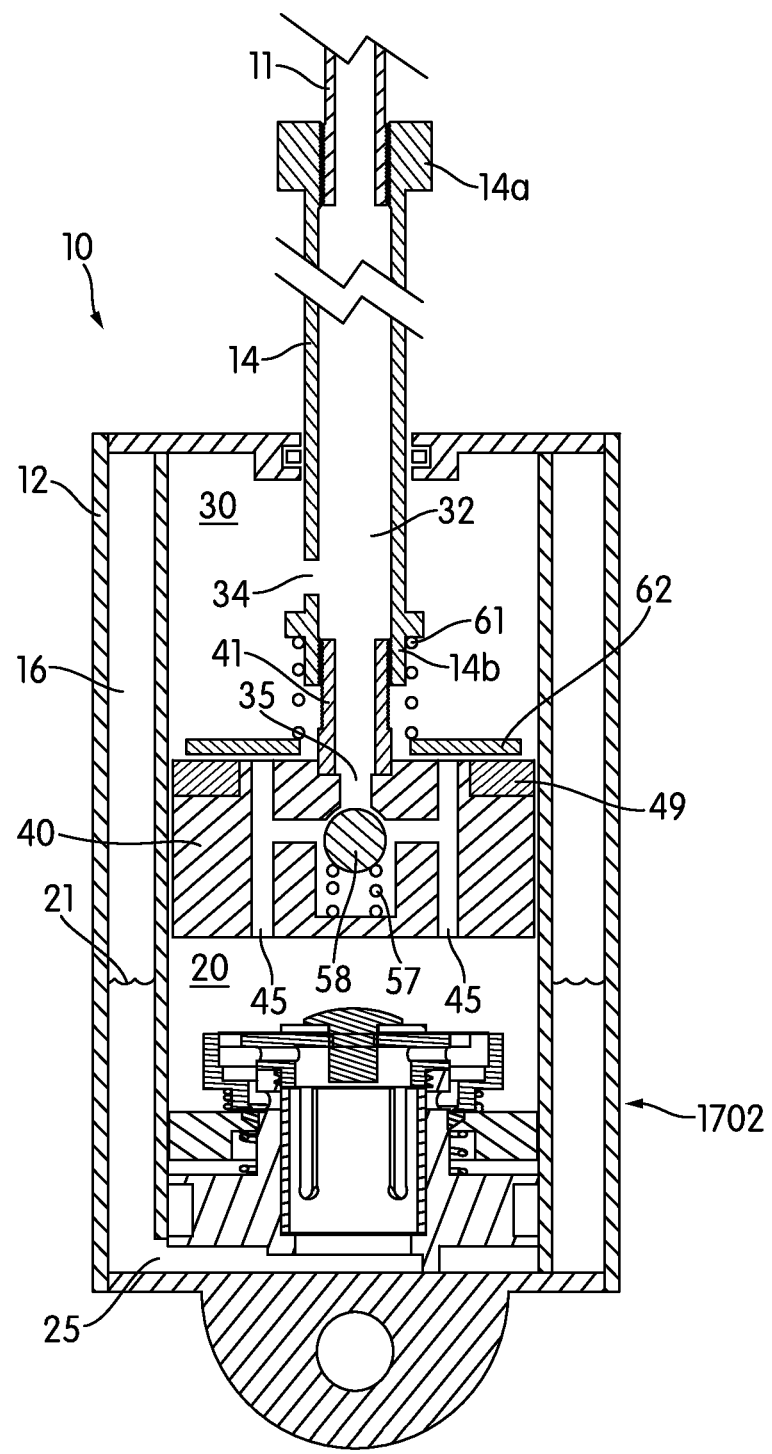
FIG. 18 is a cross-sectional view of the embodiment of FIG. 17 with the valve positioned in an alternative location.

As shown in FIG. 18, the valve 1702 may instead be positioned between a rebound chamber 30 and a reservoir chamber 16. In this embodiment the attachment of the piston rod 11 (means not shown) is to the frame or chassis of the vehicle while the housing containing the valve 1702 is attached to the wheel, so that the valve components can be responsive to inertial forces generated by movement of the wheel as described below. FIG. 18 shows the use of the valve 1702 in cooperation with the valve as shown in FIG. 1. It will be apparent to a person having ordinary skill in the art that the valve disclosed herein can be positioned directly intermediate any two adjacent fluid-filled chambers. In addition, as shown in FIG. 18, the valves can be used in combination with one another.

Figure 19:
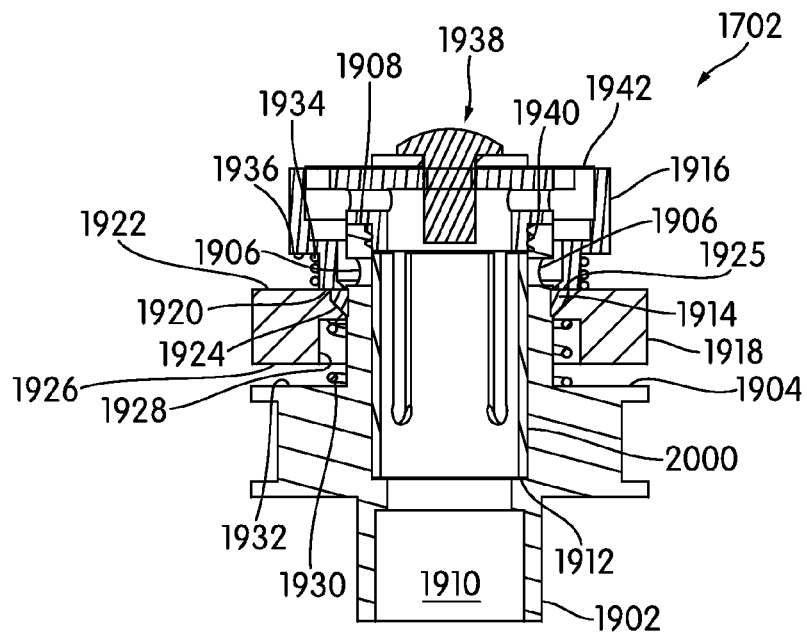
FIG. 19 is a cross-sectional view of the valve of FIG. 17 in one position.
Figure 20:
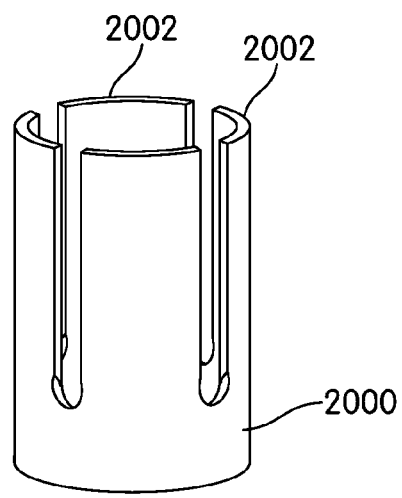
FIG. 20 is a perspective view of a reed valve that may be used in conjunction with the embodiment of FIG. 17.
Figure 21:
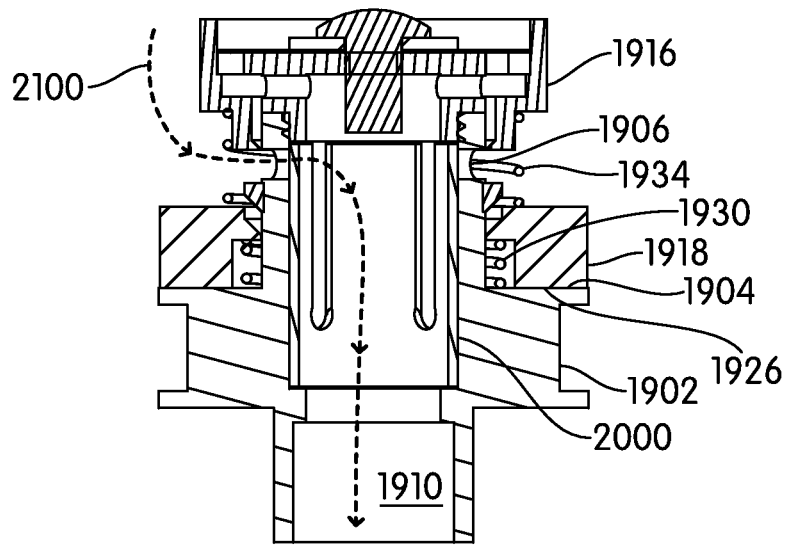
FIG. 21 is a cross-sectional view of the valve of FIG. 17 in another position.
Figure 22:
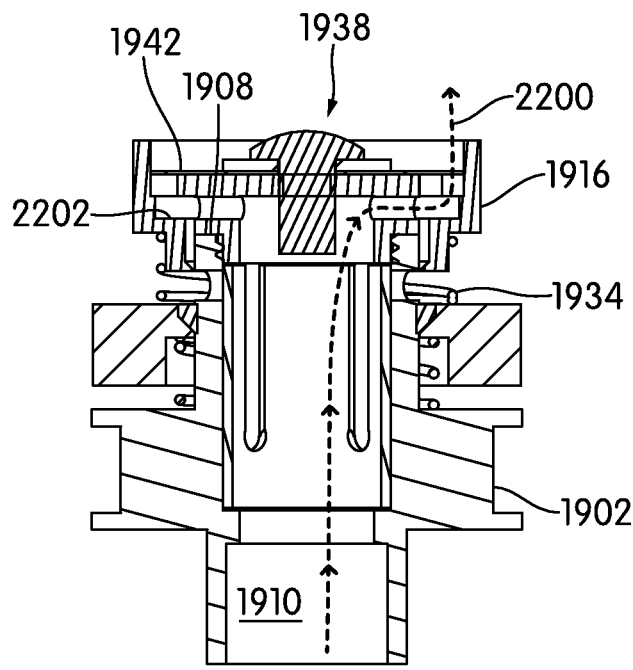
FIG. 22 is a cross-sectional view of the valve of FIG. 17 in yet another position.

The function of the valve 1702 is shown in greater detail in FIGS. 19-21, which may also be understood in combination with the overall structure of FIG. 17. FIG. 19 shows the valve 1702 in a rest or inactive position. The valve 1702 may have a number of components. The valve 1702 may include a substantially annular tube or portion 1902. The substantially annular tube 1902 may be formed integrally with the central shaft 1732 or may be attached to a free end 1748 of the central shaft 1732, for example, with corresponding threaded portions as shown at 1750. The substantially annular tube 1902 may include a shoulder portion 1904 that may extend the full inner diameter of the first telescoping member 1704 and may sealingly engage the first telescoping member 1704. The substantially annular tube 1902 may define one or more orifices 1906 around its circumference. It may be desirable for the one or more orifices 1906 to be positioned near an end 1908 of the substantially annular tube 1902. The orifices 1906 may be designed to have whatever shape and size deemed by a designer to be necessary to allow the volume of fluid flow necessary for the proper damping to be accomplished by the shock absorber 1700. The central annulus 1910 of the tube 1902 may be in fluid communication with the central annulus 1752 of the central shaft 1732. In some embodiments, the central annulus 1910 may be considered a chamber intermediate the compression chamber 1744 and the rebound chamber 1746. An additional set of one or more orifices 1754 may be formed in the tube 1902 or the central shaft 1732 to permit fluid flow between the central annuli 1752, 1910 and the rebound chamber 1746. As will be described in greater detail below, the orifices 1754 may desirably permit fluid to flow both into the annuli 1752, 1910 from the rebound chamber 1746 and out of the annuli 1752, 1910 to the rebound chamber 1746. Accordingly, in many embodiments, it may be desirable that the orifices 1754 remain completely unblocked. In another embodiment, one or more two-way valves (not shown) may be inserted into the one or more orifices 1754 to control the fluid flow. A person having ordinary skill in the art is able to select orifices of a desirable shape and size and having whatever valve structure as is necessary or desirable for a particular fluid flow and application. In many embodiments, a reed valve 2000, as is shown separately in FIG. 20 may be inserted within the annulus 1910 adjacent the one or more orifices 1906 to act as a one-way valve. In some embodiments, a shoulder 1912 may be incorporated into the annulus 1910 to assist in the proper positioning of the reed valve 2000 within the annulus. In many embodiments, the reed valve 2000 will have the same number of fingers 2002 as orifices 1906 and the orifices 1906 and fingers 2002 may correspond in shape and size to one another.

A flange 1914 may be secured to or formed integrally with the annular tube 1902. In many embodiments, the flange 1914 may be positioned adjacent the orifices 1906. Such a positioning of the flange 1914 may assist in the positioning of the substantially annular orifice blocker 1916 and the substantially annular lock 1918.

A substantially annular orifice blocker 1916 may be configured to be concentric with and outside of the substantially annular tube 1902. In a first or rest position show in FIG. 19, the orifice blocker 1916 substantially prevents fluid from flowing from a chamber outside the valve 1702 through the orifice 1906 into the valve 1702 and into another chamber. In the first position, a lower face 1920 of the orifice blocker 1916 may abut the flange 1914 and the substantially annular lock 1918. The substantially annular lock 1918 may also be substantially concentric with the annular tube 1902. The lock 1918 may include an upper face 1922 that abuts the flange 1914 and the lower face 1920 of the orifice blocker 1916. In the embodiment shown, the flange 1914 has a contoured lower face 1924 that interfits with a corresponding recess in the upper face 1922 of the annular lock 1918 and a flat upper face 1925 that corresponds to the flat lower face 1920 of the orifice blocker 1916. In other embodiments, the flange may have other configurations. In some embodiments, the flange 1914 may have two flat sides or may have a contoured side on an upper surface to mate with a corresponding recess in the orifice blocker 1916. The flange may have any shape and thickness deemed desirable by a designer. In addition, while the embodiment shown includes a flange on one side of the orifice 1906, it may be desirable in other embodiments for the flange 1914 to be positioned on another side of the orifice 1906.

The substantially annular lock 1918 may also include a lower face 1926 that may include a recess 1928. A bias, such as a spring 1930, may extend from the lower face 1926 of the annular lock 1918 to an upper face 1932 of the shoulder 1904 of the annular tube 1902. The bias 1930 may fit within the recess 1928 or may be positioned at another location along the lower face 1926 and the upper face 1932. In some embodiments, the size and shape of the recess 1928 may be selected in order to adjust the mass of the lock 1918. As will be described below, in the embodiment of FIGS. 19-22, the lock 1918 may be an inertial mass, which may be controlled, at least in part, by selecting an inertial mass having a particular mass and material. In a rest position, the bias 1930 may tend to urge the lock to a first position where the lock abuts the flange 1914 and the orifice blocker 1916.

A bias, such as a spring 1934, may be positioned to abut the top surface 1922 of the lock 1918 and a lower surface, such as a shoulder lower surface 1936, of the orifice blocker 1916. While the bias 1934 would tend to urge the orifice blocker 1916 away from the lock 1918, the force of the bias 1934 may be overcome by a magnetic attraction between the lock 1918 and the orifice blocker 1916. In some embodiments, each of lock 1918 and orifice blocker 1916 may be made of a magnetic element or magnetically attractive element, the magnetic elements being selected such that the lock 1918 and the orifice blocker 1916 are interlocked magnetically when in a rest position, such as that shown in FIG. 19. The materials selected for lock 1918 and blocker 1916 may desirably be selected so that the magnetic force between lock 1918 and blocker 1916 is greater than the spring force of the spring 1934 when at a rest position in FIG. 19. In some embodiments, lock 1918 may be made of a material that is a permanent magnet and blocker 1916 may be made of a magnetically permeable or attracted material. In other embodiments, blocker 1916 may be made of a material that is a permanent magnet and lock 1918 may be made of a magnetically permeable or attracted material. Other structures within valve 1702 may also be made from a magnetic element. In some embodiments, it may be desirable for one or both of the springs 1930 or 1934 to be made of a magnetic element in order to further tune the magnetic attraction between the other magnetic elements. In addition, in some embodiments, it may not be necessary for the entirety of the blocker 1916 or the lock 1918 to be made of a magnetic element. In some embodiments, it may be necessary or desirable for only a surface or a portion of the part to be made of a magnetic element. A person having ordinary skill in the art will be able to determine which parts of the valve 1702 should be made of a magnetic element, depending on the force needs between the blocker 1916 and lock 1918 and the manner in which the blocker 1916 and the lock 1918 respond to the action of their corresponding springs or other elements in the valve 1702.

Attached to the free end 1908 of the tube 1902 may be a cap 1938. The cap 1938 and the tube 1902 may be secured to one another with corresponding threads 1940 as shown in FIG. 19. However, other structures, such as an interference fit, latch, or adhesive, for example, could be used to secure the tube 1902 to the cap 1938. In some embodiments, cap 1938 may alternatively be secured to blocker 1916 or another structure. However, in many embodiments, the attachment of the cap 1938 to the tube 1902 may allow for easy assembly of the valve 1702.

The cap 1938 may include a number of features. The cap 1938 may include a one-way valve, such as flexible shim 1942, that is configured to allow fluid to flow from the interior of valve 1702 into an adjacent chamber. The interior structures of the cap 1938 may define a fluid passageway from the tube annulus 1910 to the one-way valve 1942. In the embodiment shown in FIG. 19, the flexible shim 1942 cooperates with the cap 1938 to create a substantially closed and serpentine fluid passageway between the annulus 1910 and the shim 1942. The precise passageway defined within the cap 1938 is not critical in many embodiments. However, in many embodiments, it may be desirable for the path to be serpentine in order to provide an appropriate and not excessive fluid pressure on the shim 1942.

The function of the valve 1702 will now be described in connection with the disclosures of FIGS. 17, 19, 21, and 22. As shown in FIG. 19, the valve 1702 is shown with the blocker 1916 in a first, rest position and the lock 1918 in a first, rest position. When a vehicle to which the shock absorber 1700 is attached encounters a bump or obstacle, the second telescoping member 1706 may move toward the first telescoping member 1704. The valve 1702, being attached to the central shaft 1732, may stay in a constant position relative to the second telescoping member 1706. However, the valve 1702 and the first telescoping member 1704 may move relative to one another.

As the first telescoping member 1704 and the valve 1702 move relative to one another, two forces may act upon the lock 1918. Because the lock 1918 functions as an inertial mass, the lock 1918 will tend to remain at its initial position due to inertial forces as the impact of a bump or other obstacle on a wheel causes the central shaft 1732 and parts rigidly attached to it to move. These inertial forces will be further enhanced by the pressure of fluid in the compression chamber 1744 flowing towards the lock 1918. These forces may move the lock 1918 relative to the tube 1902 to the second, activated position shown in FIG. 21. These forces may desirably be enough to compress the spring 1930. As shown in FIG. 21, at the full compression of the spring 1930, the lower surface 1926 of the lock 1918 may rest against the shoulder 1904 of the tube 1902. It is also noted that the inertial forces and fluid force may overcome not just the spring force from the spring 1930, but also the magnetic force between the lock 1918 and the blocker 1916. In many embodiments, the fluid force is insufficient to open the valve to compressive flow of fluid unless accompanied by inertial force. A designer is able to tune the relative amounts of inertial force and fluid force by tuning the spring rate, the size and mass of the lock 1918, and other items to create the desired proportion of force.

Once the magnetic force and spring force of the spring 1930 have been exceeded and the lock 1918 moves to the position shown in FIG. 21, the spring 1934 may be permitted to move the blocker 1916 away from the orifice 1906, as is shown in FIG. 21. Once the blocker 1916 and the lock 1918 have moved from their respective first positions of FIG. 19 to their second positions shown in FIG. 21, fluid may be permitted to flow along the pathway shown by the arrowed line 2100. Referring also to FIG. 17, fluid may be permitted to flow from the compression chamber 1744 through the orifices 1906. The fluid may deform or deflect the reed valve 2000 and flow into the annulus 1910 in the tube 1902. The fluid may then flow into the annulus 1752 in the central shaft 1732. The fluid then may exit the central shaft 1732 into the rebound chamber 1746 through the orifices 1754. The biasing force of the spring 1930 will return the lock 1918 to its first position just after the blocker moves to its second position, but since in its second position the blocker is too remote from the lock 1918 for magnetic bias alone to return the blocker to its first position, the valve will remain open throughout the compression stroke.

After the full compression stroke is completed, force from a fluid in the cavity 1740 in the second telescoping member 1706 may create pressure on the first telescoping member 1704 to begin the rebound stroke. The valve 1702 may also begin to move relative to the first telescoping member 1704. This movement may create pressure on the fluid housed within the rebound chamber 1746. The fluid may then flow through the orifices 1754 into the annulus 1752 in the central shaft 1732. The fluid may, from there, flow into the annulus in the tube 1902. The fluid may then flow out the free end 1908 of the tube and into the cap 1938. The fluid may pass through the cap 1938 and past the shim 1942 into the compression chamber 1744. As this fluid flow continues, a portion of the fluid may also create pressure on an upper interior surface 2202 of the blocker 1916 sufficient to at least partially overcome the spring force from the spring 1934. Because the spring 1934 is of a softer rate than the spring 1930, the blocker 1916 will move toward the lock 1918. The proximity of the blocker 1916 and the lock 1918 may create a mutual attraction therebetween, due to both being made from complementary magnetic elements. The magnetic force between the blocker 1916 and the lock 1918 may cause the blocker 1916 to return to and become locked in the first position as shown in FIG. 19.

The full stroke of the shock absorber 1700 thus may include both a compression stroke and a rebound stroke. As described, the blocker 1916 and the lock 1918 may reciprocate from corresponding first to second positions and then return to the first positions. As a result of these reciprocating movements, the fluid may be permitted to flow between a plurality of chambers, including between a compression chamber and a rebound chamber, the fluid pathway on the compression stroke being different from the fluid pathway on a rebound stroke.

Figure 23:
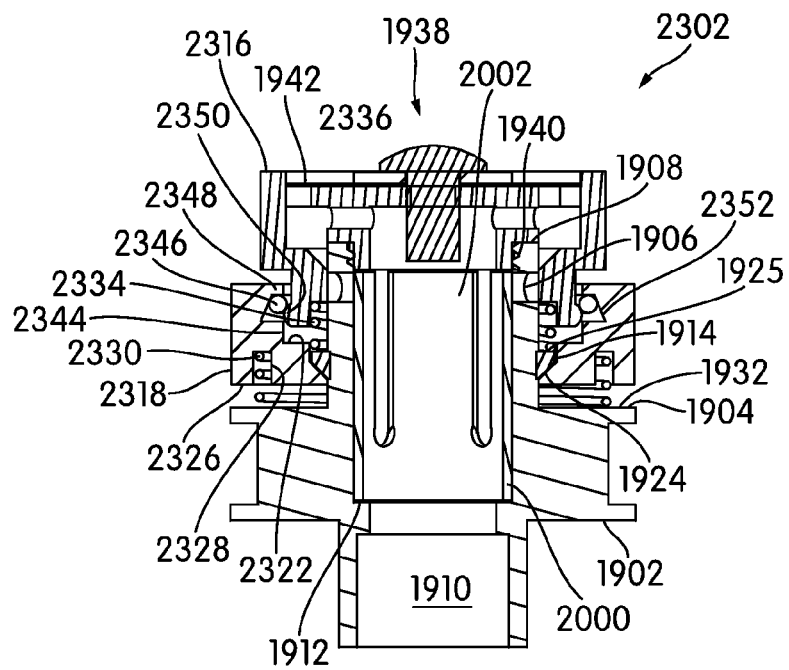
FIG. 23 is a cross-sectional view of an alternative embodiment of the valve of FIG. 17 in a first position.
Figure 24:
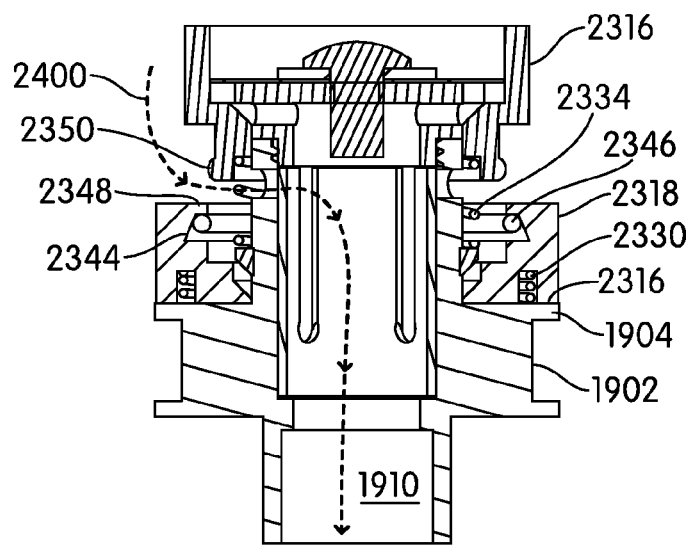
FIG. 24 is a cross-sectional view of the valve of FIG. 23 in another position.
Figure 25:
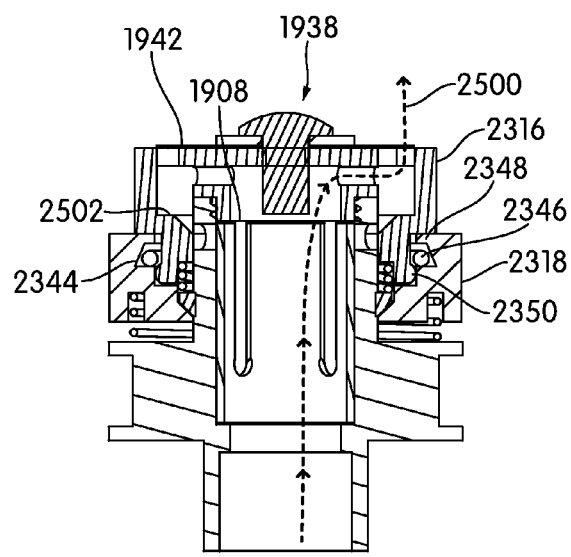
FIG. 25 is a cross-sectional view of the valve of FIG. 23 in yet another position.

A further alternative embodiment of a valve 2302 is shown in FIGS. 23-25. The embodiment of FIGS. 23-25 may be substantially interchangeable with the valve 1702 in the shock absorber 1700. The elements of the valve 2302 that are substantially identical with corresponding elements in the valve 1702 are numbered with the same numbers as in the embodiment of FIGS. 19-22. Where such numbering exists in FIGS. 23-25, a person having ordinary skill in the art will understand that those structures have substantially the same characteristics and function as those illustrated and described in connection with the embodiment of FIGS. 19-22 even if they are not specifically mentioned or described in the embodiment of FIGS. 23-25. While FIG. 17 illustrates the valve 1702, the valve 2302 is substantially interchangeable with the valve 1702. Accordingly, for the following disclosure of FIGS. 23-25, where numbers in FIG. 17 are referred to, it will be understood that Fig. should be viewed as showing the valve 2302 in replacement of the valve 1702.

Referring now to the disclosures of FIGS. 17 and 23, FIG. 23 shows the valve 2302 in a rest or inactive position. The valve 2302 has a number of components. The valve 2302 includes a substantially annular tube or portion 1902. The substantially annular tube 1902 may be formed integrally with the central shaft 1732 or may be attached to a free end 1748 of the central shaft 1732, for example, with corresponding threaded portions as shown at 1750. The substantially annular tube 1902 may include a shoulder portion 1904 that may extend the full inner diameter of the first telescoping portion 1704. The substantially annular tube 1902 may define one or more orifices 1906 around its circumference. It may be desirable for the one or more orifices 1906 to be positioned near an end 1908 of the substantially annular tube 1902. The orifices 1906 may be designed to have whatever shape and size deemed by a designer to be necessary to allow the volume of fluid flow necessary for the proper damping to be accomplished by the shock absorber 1700. The central annulus 1910 of the tube 1902 may be in fluid communication with the central annulus 1752 of the central shaft 1732. An additional set of one or more orifices 1754 may be formed in the tube 1902 or the central shaft 1732 to permit fluid flow between the central annuli 1752, 1910 and the rebound chamber 1746. As will be described in greater detail below, the orifices 1754 may desirably permit fluid to flow both into the annuli 1752, 1910 from the rebound chamber 1746 and out of the annuli 1752, 1910 to the rebound chamber 1746. Accordingly, in many embodiments, it may be desirable that the orifices 1754 remain completely unblocked. In other embodiments, one or more two-way valves (not shown) may be inserted into the one or more orifices 1754 to control the fluid flow. A person having ordinary skill in the art is able to select orifices of a desirable shape and size and having whatever valve structure as is necessary or desirable for a particular fluid flow and application. In many embodiments, a reed valve 2000, as is shown separately in FIG. 20 may be inserted within the annulus 1910 adjacent the one or more orifices 1906 to act as a one-way valve. In some embodiments, a shoulder 1912 may be incorporated into the annulus 1910 to assist in the proper positioning of the reed valve 2000 within the annulus. In many embodiments, the reed valve 2000 will have the same number of fingers 2002 as orifices 1906 and the orifices 1906 and fingers 2002 may correspond in shape and size to one another.

A flange 1914 may be secured to or formed integrally with the annular tube 1902. In many embodiments, the flange 1914 may be positioned between the orifices 1906 and the shoulder 1904. Such positioning of the flange 1914 may assist in the positioning of the substantially annular orifice blocker 2316 and the substantially annular lock 2318.

A substantially annular orifice blocker 2316 may be configured to be concentric with and outside of the substantially annular tube 1902. In a first or rest position show in FIG. 23, the orifice blocker 2316 substantially prevents fluid from flowing from a chamber outside the valve 2302 through the orifice 1906 into the valve 2302 and into another chamber. The substantially annular lock 2318 may also be substantially concentric with the annular tube 1902. The lock 2318 may include an inner face 2322 that abuts the flange 1914. In the embodiment shown, the flange 1914 has a contoured lower face 1924 that interfits with a corresponding recess in the inner face 2322 of the annular lock 2318. In other embodiments, the flange may have other configurations. In some embodiments, the flange 1914 may have two flat sides. The flange may have any shape and thickness deemed desirable by a designer. In addition, while the embodiment shown includes a flange on one side of the orifice 1906, it may be desirable in other embodiments for the flange 1914 to be positioned on another side of the orifice 1906 and to interfit instead with the blocker 2316.

The substantially annular lock 2318 may also include a lower face 2326 that may include a recess 2328. A bias, such as spring 2330, may extend from the lower face 2326 of the annular lock 2318 to an upper face 1932 of the shoulder 1904 of the annular tube 1902. The spring 2330 may fit within the recess 2328 or may be positioned at another location along the lower face 2326 and the upper face 1932. In some embodiments, the size and shape of the recess 2328 may be selected in order to adjust the mass of the lock 2318. As will be described below, in the embodiment of FIGS. 23-25, the lock 2318 may be an inertial mass, which may be controlled, at least in part, by selecting an inertial mass having a particular mass and material. In a rest position, the spring 2330 may tend to urge the lock to a first position where the lock abuts the flange 1914 and the orifice blocker 2316.

A bias, such as spring 2334, may be positioned to abut the top surface 1925 of the flange 1914 and a lower surface, such as a shoulder lower surface 2336, of the orifice blocker 2316. In other embodiments, the spring 2334 may instead contact inner surface 2322 of the lock 2318. While the spring 2334 would tend to urge the orifice blocker 2316 away from the lock 2318, the force of the spring 2334 may be overcome by a mechanical interlock between the lock 2318 and the orifice blocker 2316.

As is shown in FIG. 23, the lock 2318 may include an inner recess 2344. Inner recess 2344 may be substantially annular. The inner recess 2344 may house a resilient o-ring 2346. In the rest position, the resilient o-ring 2346 may be positioned within the inner recess 2344 adjacent an inward facing lip 2348 on the lock 2318. The orifice blocker 2316 may include an outward facing lip 2350 that is positioned, in the first position, adjacent the o-ring 2346. As is shown in FIG. 23, in the first position, the o-ring 2346 may be sandwiched between the outward facing lip 2350 of the orifice blocker 2316 on a lower side and the inward facing lip 2348 of the lock 2318 on the upper side. The interference between the o-ring 2346 and the two corresponding lips 2348 and 2350 may serve to removably interlock the orifice blocker 2316 and the lock 2318.

In the illustrated embodiment, the inward facing lip 2348 is shown as having a squared profile and the outward facing lip 2350 is shown as having a curved profile. In many embodiments, such profiles may be desirable to allow the o-ring 2346 to be retained in the recess 2344, while still permitting relative movement between the o-ring 2346 and the outward facing lip 2348. However, such profiles are not required. A person having ordinary skill in the art is able to select the appropriate thickness, shape, size, and profile of the lips 2348 and 2350 to create an appropriate interlock.

It may also be observed that the recess 2344 in which the o-ring 2346 is positioned includes a tapered portion 2352. In many embodiments, it may be desirable for the recess 2344 to have a shape and size so that the o-ring 2346 may be pushed away from the inward-facing lip 2348. The profile of the recess 2344 may differ from that shown in the Figs., and in some embodiments it may not be necessary or desirable for the recess to be as large as that shown in the Figs. A person having ordinary skill in the art can make appropriate design changes to permit relative movement of the inward facing lip 2348, outward facing lip 2350 and the o-ring 2346 that the designer think is appropriate for a particular application without undue experimentation.

Attached to the free end 1908 of the tube 1902 may be a cap 1938. The cap 1938 and the tube 1902 may be secured to one another with corresponding threads 1940 as shown in FIG. 23. However, other structures, such as an interference fit, latch, or adhesive, for example, could be used to secure the tube 1902 to the cap 1938. In some embodiments, the cap 1938 may alternatively be secured to blocker 2316 or another structure. However, in many embodiments, the attachment of the cap 1938 to the tube 1902 may allow for easy assembly of the valve 2302.

The cap 1938 may include a number of features. The cap 1938 may include a one-way valve, such as the flexible shim 1942, that is configured to allow fluid to flow from the interior of valve 2302 into an adjacent chamber. The interior structures of the cap 1938 may define a fluid passageway from the tube annulus 1910 to the flexible shim 1942. In the embodiment shown in FIG. 23, the flexible shim 1942 cooperates with the cap 1938 to create a substantially closed and serpentine fluid passageway between the annulus 1910 and the shim 1942. The precise passageway defined within the cap 1938 is not critical in many embodiments. However, in many embodiments, it may be desirable for the path to be serpentine in order to provide an appropriate and not excessive fluid pressure on the shim 1942.

The function of the valve 2302 will now be described in connection with the disclosures of FIGS. 17, 23, 24, and 25. As shown in FIG. 23, the valve 2302 is shown with the blocker 2316 in a first, rest position and the lock 2318 in a first, rest position. When a vehicle to which the shock absorber 1700 is attached encounters a bump or obstacle, the first telescoping member 1704 and the second telescoping member 1706 may move toward one another. The valve 2302, being attached to the central shaft 1732, may stay in a constant position relative to the second telescoping member 1706. However, the valve 1702 and the first telescoping member 1704 may move relative to one another.

As the first telescoping member 1704 and the valve 1702 move relative to one another, two forces may act upon the lock 2318. Because the lock 2318 functions as an inertial mass, the lock 2318 will tend to remain at its initial position due to inertial forces. These inertial forces will be further enhanced by the pressure of fluid in the compression chamber 1744 flowing towards the lock 2318. These forces may move the lock 2318 relative to the tube 1902 to the second, activated position shown in FIG. 24. These forces may desirably be enough to compress the spring 2330. As shown in FIG. 24, at the full compression of the spring 2330, the lower surface 2326 of the lock 2318 may rest against the shoulder 1904 of the tube 1902. In many embodiments, the fluid force is insufficient to overcome the bias of spring 2330 and the interference between the o-ring 2346 and the lip 2348 unless accompanied by inertial force. A designer is able to tune the relative amounts of inertial force and fluid force by tuning the spring rate, the size and mass of the lock 2318, and other items to create the desired proportion of force.

When the inertial forces and fluid force move the lock 2318 downward into the second or activated position of FIG. 24, the outward facing lip 2350 of the blocker 2316 may compress the o-ring 2346 and thereby move upward and past the inward facing lip 2348, under the influence of the bias 2334 and fluid pressure. Once the blocker 2316 and the lock 2318 have moved from their respective first positions of FIG. 23 to their second positions shown in FIG. 24, fluid may be permitted to flow along the pathway shown by the arrowed line 2400. Referring also to FIG. 17, fluid may be permitted to flow from the compression chamber 1744 through the orifices 1906. The fluid may deform or deflect the reed valve 2000 and flow into the annulus 1910 in the tube 1902. The fluid may then flow into the annulus 1752 in the central shaft 1732. The fluid then may exit the central shaft 1732 into the reservoir chamber 1746 through the orifices 1754. The biasing force of the spring 2330 will return the lock 2318 to its first position just after the blocker 2316 moves to its second position, but since the blocker is maintained in its second position by the bias 2334 and fluid pressure, the valve will remain open throughout the compression stroke.

After the full compression stroke is completed, force from a fluid in the cavity 1740 in the second telescoping member 1706 may create pressure on the first telescoping member 1702 to begin the rebound stroke. The valve 2302 may also begin to move relative to the first telescoping member 1702. This movement may create pressure on the fluid housed within the rebound chamber 1746. The fluid may then flow through the orifices 1754 into the annulus 1752 in the central shaft 1732. The fluid may, from there, flow into the annulus in the tube 1902. The fluid may then flow out the free end 1908 of the tube and into the cap 1938. The fluid may pass through the cap 1938 and past the shim 1942 into the compression chamber 1744. This fluid flow is shown in FIG. 25 in arrowed line 2500. As this fluid flow continues, a portion of the fluid may also create pressure on an upper interior surface 2502 of the blocker 2316 sufficient to overcome the spring force from the spring 2334, thereby moving the blocker 2316 towards the lock 2318. The pressure on the blocker is also sufficient to overcome expansive resistance of the o-ring 2346 as described below.

When the blocker 2316 moves towards the lock 2318, the outward facing lip 2350 may pass beyond the inward facing lip 2348 of the lock 2318 and may come into contact with the o-ring 2346, thereby causing the o-ring 2346 to move further into the cavity 2344 as shown in FIG. 25. In this position the o-ring is free to expand slightly in diameter to permit the outward facing lip 2350 to pass below it. At the end of the rebound stroke, the fluid force on the upper interior surface 2502 of the blocker 2316 may cease. Once the fluid force ceases, the biasing forces of the springs 2330 and 2334 may cause the blocker 2316 and the lock 2318 to return to their first, equilibrium positions as shown in FIG. 23.

The full stroke of the shock absorber 1700 thus may include both a compression stroke and a rebound stroke. As described, the blocker 2316 and the lock 2318 may reciprocate from corresponding first to second positions and then return to the first positions. As a result of these reciprocating movements, the fluid may be permitted to flow between a plurality of chambers, including between a compression chamber and a rebound chamber, the fluid pathway on the compression stroke being different from the fluid pathway on a rebound stroke.

Figure 26:
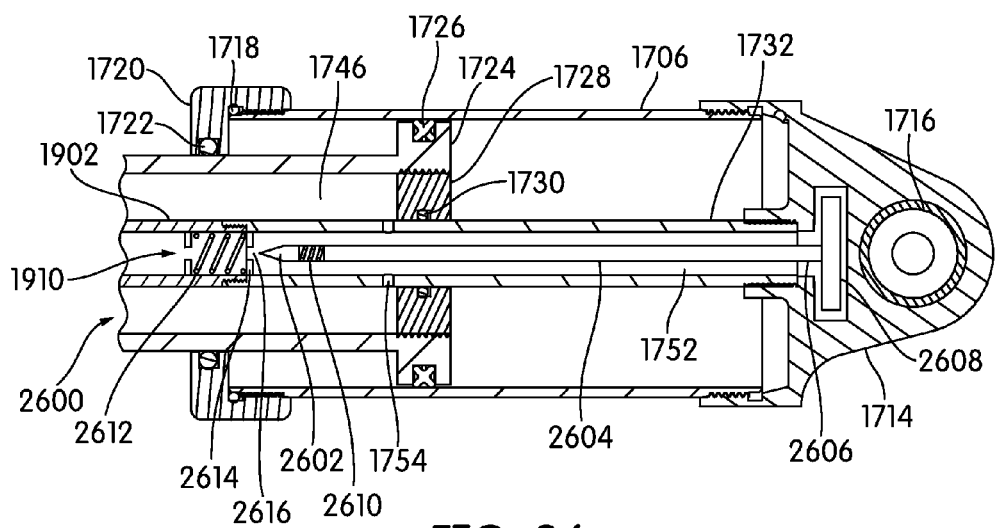
FIG. 26 is a cross-sectional view, partially cut away, of a supplemental valve for controlling fluid flow.

FIG. 26 illustrates a supplemental valve that may be used in connection with the embodiment of FIGS. 19-22 and the embodiment of FIGS. 23-25. The supplemental valve 2600 may be positioned within the annulus 1752 of the central shaft 1732 and the annulus 1910 of the annular tube 1902. In some embodiments, the supplemental valve 2600 may include a tapered head 2602. The longitudinal position of the tapered head 2602 may be adjusted by adjusting the length of the control rod 2604. On the opposite end 2606 of the control rod 2604 is an adjustment wheel 2608 that may be manipulable by a user to determine the appropriate position of the tapered head 2602 and the force applied to the spring 2610 and the spring 2612. In a rest position, the tapered head 2602 may press against the washer 2614 in a manner to compress either spring 2610, spring 2612, or both. In other embodiments, the tapered head 2602 may be spaced from the washer 2614 and act as a meter to impede the flow of fluid through the washer 2614. When the shock absorber 1700 undergoes compression, the fluid may flow through the tube annulus 1910 towards the tapered head 2602. The force of the fluid may force the head 2602 towards the free end 2606, thereby allowing fluid to flow past the head 2602 and through the orifices 1754 into the compression chamber 1746. Once the compression stroke is over, the force of the fluid against the head 2602 ceases and the spring 2610 may return the head 2602 to its rest position. As the rebound stroke begins, fluid may flow out of the rebound chamber 1746, through the orifices 1754 and through the gap 2616 in the washer 2614. The relative position of the head 2602 and the washer 2614 may govern the speed and volume of flow permitted through the washer 2614. If the force from the rebound chamber exceeds a desired amount, the spring 2612 may compress and thereby move the washer 2614 further from the head 2602 to allow greater fluid flow through the washer 2614. The use of such a secondary valve may be optional in some embodiments and highly important in other embodiments, such as when it is desired to control rebound flow of fluid. A person having ordinary skill in the art will be able to adjust the valve 2600 to accomplish the desired purpose without undue experimentation.

While certain preferred embodiments of the present invention have been disclosed in detail, it is to be understood that various modifications may be adopted without departing from the spirit of the invention or scope of the following claims.

The invention claimed is:

1. A shock absorber having a housing with a cylindrical sidewall, comprising:
   (a) a valve in a fluid communication path between a first chamber containing fluid and a second chamber containing fluid, the valve having an orifice component and a moveable orifice blocker component, wherein the blocker has at least an open position in which fluid can flow through the orifice and a closed position in which the blocker substantially obstructs fluid from flowing through the orifice;
   (b) at least one biasing element disposed in the valve that exerts a biasing force urging the blocker toward said closed position and contributes to a total biasing force that urges said blocker in the closed position to remain in said closed position;
   (c) wherein at least one of the blocker and the biasing element is configured to move at least partially through an inertial effect of forces; and
   (d) wherein every component of said total biasing force is applied to the blocker by structures contained entirely within the shock absorber and every component of said total biasing force that is controlled so as to vary said total biasing force is controlled only by at least one non-electromagnetic device selected from the group of pneumatic, hydraulic and mechanical devices; and wherein when the blocker is in the open position the biasing force urging the blocker back to the closed position is no greater for any particular piston stroke position than said corresponding total biasing force at said particular piston stroke position.

2. The shock absorber according to claim 1, further comprising a third chamber in fluid communication with at least one of the other two chambers.

3. The shock absorber according to claim 2, wherein the first chamber is a compression chamber, the second chamber is a rebound chamber and the third chamber is a reservoir chamber.

4. The shock absorber according to claim 2, further comprising a secondary valve disposed in a fluid communication passage between the third chamber and at least one of the other two chambers.

5. A shock absorber with a housing having a cylindrical sidewall, a piston slidably mounted in, and sealingly engaging, the sidewall, a first chamber formed on one side of the piston within the housing and containing fluid and a second chamber in the housing containing fluid, the shock absorber comprising:
   (a) a valve in a fluid communication path between the first and second chambers, the valve having an orifice component and an orifice blocker component, wherein the blocker has at least an open position in which fluid can flow through the orifice and a closed position in which the blocker substantially obstructs fluid from flowing through the orifice; and
   (b) a permanent magnet in at least one of said valve components and a magnetically permeable body in the other of said valve components, whereby the blocker is urged toward one of the blocker positions by a magnetic bias formed by the permanent magnet and the magnetically permeable body, wherein the valve is configured such that upon sufficient inertial force upon at least one valve component the magnetic bias is exceeded, thereby moving the blocker from the one of the blocker positions to the other of the blocker positions.

6. The shock absorber in accordance with claim 5, wherein the first chamber is a compression chamber and the second chamber is a rebound chamber.

7. The shock absorber in accordance with claim 5, wherein the magnetic bias tends to bias the blocker toward the closed position.

8. The shock absorber in accordance with claim 5, further comprising a third chamber intermediate the first chamber and the second chamber.

9. The shock absorber in accordance with claim 5, further comprising at least a second orifice allowing fluid passage through the piston.

10. A shock absorber with a housing having a cylindrical sidewall, a piston slidably mounted in, and sealingly engaging, the sidewall, a first chamber formed on one side of the piston within the housing and containing fluid, a second chamber in the housing containing fluid, a third chamber in fluid communication with the first chamber, the shock absorber comprising:
    (a) an inertial valve in a fluid communication path between the first chamber and a selected one of the other chambers, the valve having at least an orifice and an orifice blocker, wherein the relative position of the orifice and the orifice blocker may vary between at least (i) an open valve position in which fluid can flow through the orifice between the first chamber and the selected chamber and (ii) a closed valve position in which the orifice blocker substantially obstructs fluid from flowing through the orifice; and
    (b) a permanent magnet in at least one valve component and a magnetically permeable body in another valve component, whereby the valve components are urged toward one of the valve positions by a magnetic bias formed by the permanent magnet and the magnetically permeable body, wherein the magnetic bias is exceeded, at least in part, by inertial force.

11. The shock absorber in accordance with claim 10, wherein the first chamber is a compression chamber, the second chamber is a rebound chamber, and the third chamber is a reservoir chamber.

12. The shock absorber in accordance with claim 10, wherein the magnetic bias tends to bias the blocker toward the closed position.

13. The shock absorber in accordance with claim 10, further comprising a fourth chamber intermediate the first chamber and the second chamber.

14. The shock absorber in accordance with claim 10, further comprising at least a second orifice allowing fluid passage through the piston.

15. A shock absorber having a housing with a cylindrical sidewall, a piston slidably mounted for reciprocating through a piston stroke in, and sealingly engaging, the sidewall, a first chamber formed on one side of the piston within the housing and containing fluid, a second chamber in the housing containing fluid, a third chamber accommodating a variable volume of fluid, said third chamber in fluid communication with the first chamber, the shock absorber comprising:
  (a) a valve in a fluid communication path between the first chamber and a selected one of the other chambers, the valve having an orifice, an opener spaced from the orifice and a blocker, wherein the blocker has at least an open position in which fluid can flow through the orifice and a closed position in which the blocker substantially obstructs fluid from flowing through the orifice; and
  (b) a non-electromagnetic permanent magnet in one of said blocker and said opener, and a magnetically permeable body in the other of said blocker and said opener for urging the blocker toward one of the open position or the closed position, wherein the blocker is configured to move from one of the blocker positions to the other of the blocker positions upon the application of sufficient inertial force in operable position and wherein the magnetically permeable body is selected from the group consisting of non-electromagnetic permanent magnets and iron-containing bodies that are not electromagnets.

16. The shock absorber in accordance with claim 15, wherein the first chamber is a compression chamber, the second chamber is a rebound chamber, and the third chamber is a reservoir chamber.

17. The shock absorber in accordance with claim 15, wherein magnetic bias tends to bias the blocker toward the closed position.

18. The shock absorber in accordance with claim 15, further comprising a fourth chamber intermediate the first chamber and the second chamber.

19. The shock absorber in accordance with claim 15, further comprising at least a second orifice allowing fluid passage through the piston.

20. The shock absorber according to claim 15, further comprising a mechanical spring seating against the blocker and urging the blocker toward the closed position.

21. A shock absorber with a housing having a cylindrical sidewall, a first chamber containing fluid, and a second chamber containing fluid, the shock absorber comprising:
  (a) a valve in a fluid communication path between the first chamber and the second chamber, the valve having an orifice component and an orifice blocker component, wherein the orifice component and the orifice blocker component are configured to move relative to one another between at least an open valve position in which the orifice blocker component is spaced from the orifice component and a closed valve position in which the orifice blocker component is adjacent, and substantially obstructs fluid from flowing through, the orifice;
  (b) a magnetically attractive element positioned adjacent the orifice blocker component, whereby the orifice blocking component is urged toward one of the valve positions by a magnetic bias formed by the magnetically attractive element and the orifice blocker component; and
  (c) wherein upon sufficient inertial effect of force upon at least one of the orifice blocking component and the magnetically attractive element, the magnetic bias between the magnetically attractive element and the orifice blocker component is exceeded, thereby permitting the orifice blocker component to move from one of the valve positions to the other of the valve positions.

22. The shock absorber according to claim 21, further comprising a biased secondary valve configured to open and close a second orifice.

23. The shock absorber according to claim 21, wherein the first chamber is a compression chamber and the second chamber is a rebound chamber.

24. The shock absorber according to claim 23, further comprising a reservoir chamber in fluid communication with at least one of the first chamber and the second chamber.

25. The shock absorber according to claim 21, wherein the valve defines a serpentine path for fluid to travel.

26. The shock absorber according to claim 21, wherein the magnetically attractive element comprises a permanent magnet.

27. The shock absorber according to claim 21, wherein the orifice blocking component comprises a permanent magnet.

* * * * *